(12) United States Patent
Sugiura et al.

(10) Patent No.: US 10,824,315 B2
(45) Date of Patent: Nov. 3, 2020

(54) MEDICAL IMAGE PROCESSING APPARATUS, MAGNETIC RESONANCE IMAGING APPARATUS AND MEDICAL IMAGE PROCESSING METHOD

(71) Applicant: TOSHIBA MEDICAL SYSTEMS CORPORATION, Otawara-shi (JP)

(72) Inventors: Takamasa Sugiura, Kawasaki (JP); Kensuke Shinoda, Sakura (JP); Shuhei Nitta, Ohta (JP); Tomoyuki Takeguchi, Kawasaki (JP)

(73) Assignee: CANON MEDICAL SYSTEMS CORPORATION, Otawara-shi (JP)

( * ) Notice: Subject to any disclaimer, the term of this patent is extended or adjusted under 35 U.S.C. 154(b) by 386 days.

(21) Appl. No.: 15/155,292

(22) Filed: May 16, 2016

(65) Prior Publication Data

US 2016/0349975 A1 Dec. 1, 2016

(30) Foreign Application Priority Data

May 29, 2015 (JP) .................................. 2015-110511
May 29, 2015 (JP) .................................. 2015-110512

(51) Int. Cl.
*G06F 3/0484* (2013.01)
*G06K 9/32* (2006.01)
(Continued)

(52) U.S. Cl.
CPC ...... *G06F 3/04847* (2013.01); *G06F 3/04845* (2013.01); *G06K 9/3275* (2013.01);
(Continued)

(58) Field of Classification Search
CPC ............. G06F 3/048; A61B 2090/3983; G06T 2210/41; G06T 19/003; G06T 2200/24
See application file for complete search history.

(56) References Cited

U.S. PATENT DOCUMENTS 5,954,650 A * 9/1999 Saito ....................... G06T 11/00
382/128
7,623,697 B1 * 11/2009 Hughes ............... G06F 3/04845
345/626
(Continued)

FOREIGN PATENT DOCUMENTS

| JP | 6-215153 | 8/1994 |
| JP | 2000-279399 | 10/2000 |

(Continued)

OTHER PUBLICATIONS

Japanese Office Action dated Jan. 8, 2019 in Japanese Patent Application No. 2015-110512.

(Continued)

*Primary Examiner* — Ryan F Pitaro
(74) *Attorney, Agent, or Firm* — Oblon, McClelland, Maier & Neustadt, L.L.P.

(57) ABSTRACT

A medical image processing apparatus according to a present embodiment includes processing circuitry. The processing circuitry is configured to accept an operation for a region of interest (ROI) GUI and a guide GUI on a screen on which a medical image is displayed, the ROI GUI being for setting a ROI on the medical image, the guide GUI being for guiding a setting of the ROI on the medical image. The processing circuitry is configured to decide whether to move the ROI GUI and the guide GUI in a manner interlocked with each other or not according to a preset condition, when a turning operation or a sliding operation for any one of the ROI GUI and the guide GUI is accepted.

20 Claims, 15 Drawing Sheets

(51) Int. Cl.
*G06K 9/62* (2006.01)
*G06T 19/00* (2011.01)

(52) U.S. Cl.
CPC ............ *G06K 9/6253* (2013.01); *G06T 19/00* (2013.01); *G06K 2209/05* (2013.01); *G06T 2200/24* (2013.01); *G06T 2210/41* (2013.01)

(56) References Cited

U.S. PATENT DOCUMENTS

| | | | | |
|---|---|---|---|---|
| 7,736,316 B2* | 6/2010 | Kawashima | ............ | A61B 8/12 382/131 |
| 9,262,038 B2* | 2/2016 | Sheasby | ............... | G06F 3/0481 |
| 9,554,762 B2* | 1/2017 | Kim | ............... | A61B 6/48 |
| 10,466,863 B1* | 11/2019 | Guy | ................... | G06F 3/04845 |
| 2002/0057828 A1* | 5/2002 | Oosawa | ................... | G06T 7/60 382/132 |
| 2003/0026469 A1* | 2/2003 | Kreang-Arekul | ........ | G06K 9/32 382/132 |
| 2005/0020917 A1* | 1/2005 | Scherch | ................... | A61B 8/08 600/437 |
| 2005/0267360 A1* | 12/2005 | Birkenbach | ............ | A61B 90/36 600/423 |
| 2006/0104523 A1* | 5/2006 | Suzuki | ............... | H04N 5/23216 382/232 |
| 2006/0109259 A1* | 5/2006 | Ohta | ................... | G06F 3/0485 345/173 |
| 2006/0274885 A1* | 12/2006 | Wang | ................... | G06Q 50/22 378/65 |
| 2008/0022218 A1* | 1/2008 | Cai | ........................ | G06T 1/60 715/769 |
| 2008/0112605 A1* | 5/2008 | Hong | ........................ | G06T 7/74 382/131 |
| 2008/0298645 A1* | 12/2008 | Doi | ................... | G06K 9/00221 382/118 |
| 2009/0006969 A1* | 1/2009 | Gahm | ................... | G02B 21/367 715/732 |
| 2009/0119597 A1* | 5/2009 | Vaughan | ................ | G06T 13/80 715/732 |
| 2009/0210818 A1* | 8/2009 | Hartmann | ................ | G06T 7/33 715/781 |
| 2010/0077358 A1* | 3/2010 | Sugaya | ................ | G06F 19/321 715/838 |
| 2010/0179427 A1* | 7/2010 | Yamamoto | ............... | A61B 8/00 600/443 |
| 2010/0309305 A1* | 12/2010 | Nakatsuka | ........... | H04N 5/2352 348/79 |
| 2011/0126138 A1* | 5/2011 | Kawai | ................ | G06F 3/04845 715/765 |
| 2012/0200560 A1 | 8/2012 | Masumoto | | |
| 2012/0269416 A1* | 10/2012 | Waki | ........................ | A61B 8/08 382/131 |
| 2012/0290976 A1* | 11/2012 | Lahm | ................ | G06T 19/00 715/810 |
| 2013/0063380 A1* | 3/2013 | Wang | ................ | G06F 3/04883 345/173 |
| 2013/0094593 A1* | 4/2013 | Huang | ................ | G06F 3/0488 375/240.26 |
| 2013/0218024 A1* | 8/2013 | Boctor | ................... | A61B 34/20 600/476 |
| 2013/0222313 A1* | 8/2013 | Nakamura | .......... | G06F 3/04883 345/173 |
| 2014/0009386 A1* | 1/2014 | Liu | ........................ | G06F 3/0481 345/156 |
| 2014/0022433 A1* | 1/2014 | Glennie | ............. | H04N 5/23212 348/333.02 |
| 2014/0059486 A1* | 2/2014 | Sasaki | ................ | G01S 7/52084 715/810 |
| 2014/0098049 A1* | 4/2014 | Koch | ..................... | G06F 3/016 345/173 |
| 2014/0173438 A1* | 6/2014 | Krikke | ................... | B65H 45/12 715/723 |
| 2014/0181717 A1* | 6/2014 | Lahti | ................... | G06F 3/04883 715/771 |
| 2014/0184587 A1* | 7/2014 | Park | ........................ | G06T 19/00 345/419 |
| 2014/0185903 A1* | 7/2014 | Fukuda | ................ | A61B 6/502 382/132 |
| 2014/0185910 A1* | 7/2014 | Bryll | ........................ | G06K 9/50 382/141 |
| 2014/0189507 A1* | 7/2014 | Valente | ................ | G06Q 50/20 715/705 |
| 2014/0250406 A1* | 9/2014 | Seo | ........................ | G06F 3/0488 715/781 |
| 2014/0294284 A1* | 10/2014 | Bryll | ..................... | G06T 7/0004 382/152 |
| 2015/0170412 A1* | 6/2015 | Bendall | ................... | G06T 17/00 382/119 |
| 2015/0212596 A1* | 7/2015 | Shi | ........................ | G09G 3/344 345/173 |
| 2015/0253407 A1* | 9/2015 | Nitta | ................... | A61B 5/7425 382/131 |
| 2015/0272543 A1* | 10/2015 | Kim | ..................... | A61B 8/4245 600/437 |
| 2016/0048965 A1* | 2/2016 | Stehle | ................... | G06T 7/0016 382/131 |
| 2016/0067402 A1* | 3/2016 | Yi | ........................ | A61M 5/007 600/431 |
| 2016/0139789 A1* | 5/2016 | Jin | ..................... | G06F 3/04847 715/771 |
| 2016/0163050 A1* | 6/2016 | Wang | ..................... | G06T 3/602 382/132 |
| 2016/0171158 A1* | 6/2016 | Park | ..................... | G06F 19/321 715/771 |
| 2016/0198053 A1* | 7/2016 | Saito | ................... | H04N 1/00411 715/274 |
| 2016/0349957 A1* | 12/2016 | Lee | ........................ | G06F 3/0482 |
| 2016/0381282 A1* | 12/2016 | Bandlamudi | ...... | H04N 5/23212 348/240.3 |
| 2017/0124701 A1* | 5/2017 | Liang | ..................... | G06T 7/0012 |
| 2017/0132784 A1* | 5/2017 | Yamada | ................ | G01B 11/25 |
| 2017/0285841 A1* | 10/2017 | Kunimoto | ............ | G06F 3/0416 |

FOREIGN PATENT DOCUMENTS

| | | |
|---|---|---|
| JP | 2001-209785 A | 8/2001 |
| JP | 2004-113592 | 4/2004 |
| JP | 2006-305203 | 11/2006 |
| JP | 2012-161460 | 8/2012 |
| JP | 2013-39200 | 2/2013 |
| JP | 2013-198736 | 10/2013 |
| WO | WO2012/008296 | 1/2012 |

OTHER PUBLICATIONS

Japanese Office Action dated Feb. 5, 2019 in Japanese Patent Application No. 2015-110511.

* cited by examiner

FIRST PIECE M1 OF MOVEMENT INFORMATION

| MOVING OPERATION TARGET | MOVING OPERATION TYPE | MOVING TARGET ||
| --- | --- | --- | --- |
| | | GUIDE GUI | ROI GUI |
| GUIDE GUI | TURNING OPERATION | YES | YES (INTERLOCKED) |
| | SLIDING OPERATION | YES | NO (NON-INTERLOCKED) |
| ROI GUI | TURNING OPERATION | NO (NON-INTERLOCKED) | YES |
| | SLIDING OPERATION | NO (NON-INTERLOCKED) | YES |

FIG. 2A

SECOND PIECE M2 OF MOVEMENT INFORMATION

| MOVING OPERATION TARGET | MOVING OPERATION TYPE | MOVING TARGET ||
| --- | --- | --- | --- |
| | | GUIDE GUI | ROI GUI |
| GUIDE GUI | TURNING OPERATION | YES | YES (INTERLOCKED) |
| | SLIDING OPERATION | YES | NO (NON-INTERLOCKED) |
| ROI GUI | TURNING OPERATION | YES (INTERLOCKED) | YES |
| | SLIDING OPERATION | NO (NON-INTERLOCKED) | YES |

FIG. 2B

THIRD PIECE M3 OF MOVEMENT INFORMATION

| MOVING OPERATION TARGET | MOVING OPERATION TYPE | MOVING TARGET ||
| --- | --- | --- | --- |
| | | GUIDE GUI | ROI GUI |
| GUIDE GUI | TURNING OPERATION | YES | YES (INTERLOCKED) |
| | SLIDING OPERATION | YES | YES (INTERLOCKED) |
| ROI GUI | TURNING OPERATION | YES (INTERLOCKED) | YES |
| | SLIDING OPERATION | YES (INTERLOCKED) | YES |

FIG. 2C

FOURTH PIECE M4 OF MOVEMENT INFORMATION

| MOVING OPERATION TARGET | MOVING OPERATION TYPE | MOVING TARGET | |
| --- | --- | --- | --- |
| | | GUIDE GUI | ROI GUI |
| GUIDE GUI | TURNING OPERATION | YES | YES (INTERLOCKED) |
| | SLIDING OPERATION | YES | YES (INTERLOCKED) |
| ROI GUI | TURNING OPERATION | NO (NON-INTERLOCKED) | NO |
| | SLIDING OPERATION | NO (NON-INTERLOCKED) | NO |

FIG. 2D

FIFTH PIECE M5 OF MOVEMENT INFORMATION

| MOVING OPERATION TARGET | MOVING OPERATION TYPE | MOVING TARGET | |
| --- | --- | --- | --- |
| | | GUIDE GUI | ROI GUI |
| GUIDE GUI | TURNING OPERATION | YES | NO (NON-INTERLOCKED) |
| | SLIDING OPERATION | YES | NO (NON-INTERLOCKED) |
| ROI GUI | TURNING OPERATION | NO (NON-INTERLOCKED) | YES |
| | SLIDING OPERATION | NO (NON-INTERLOCKED) | YES |

FIG. 2E

FIRST ATTRIBUTE INFORMATION TABLE T1

| ATTRIBUTE INFORMATION | MOVEMENT INFORMATION | RELATIVE POSITION (xn, yn, zn) OF ROI GUI | OFFSET ANGLE ($\theta$) OF ROI GUI |
|---|---|---|---|
| IMAGING REGION INFORMATION | | | |
| BRAIN | M1 | (x1, y1, z1) | 0° |
| KNEE | M2 | (x2, y2, z2) | 5° |
| AORTIC VALVE/ PULMONARY VALVE | M3 | (x3, y3, z3) | 0° |
| HEART | M4 | (x4, y4, z4) | 20° |

FIG. 3A

SECOND ATTRIBUTE INFORMATION TABLE T2

| ATTRIBUTE INFORMATION | MOVEMENT INFORMATION | RELATIVE POSITION (xn, yn, zn) OF ROI GUI | OFFSET ANGLE ($\theta$) OF ROI GUI |
|---|---|---|---|
| OPERATOR IDENTIFICATION INFORMATION | | | |
| O1 | M1 | (x1, y1, z1) | 5° |
| O2 | M2 | (x2, y2, z2) | 0° |
| O3 | M1 | (x1, y1, z1) | 0° |

FIG. 3B

THIRD ATTRIBUTE INFORMATION TABLE T3

| ATTRIBUTE INFORMATION | MOVEMENT INFORMATION | RELATIVE POSITION (xn, yn, zn) OF ROI GUI | OFFSET ANGLE ($\theta$) OF ROI GUI |
|---|---|---|---|
| PATIENT IDENTIFICATION INFORMATION | | | |
| P1 | M1 | (x1, y1, z1) | 0° |
| P2 | M2 | (x2, y2, z2) | 0° |
| P3 | M3 | (x3, y3, z3) | 5° |

FIG. 3C

MEDICAL IMAGE PROCESSING APPARATUS, MAGNETIC RESONANCE IMAGING APPARATUS AND MEDICAL IMAGE PROCESSING METHOD

CROSS-REFERENCE TO RELATED APPLICATION

This application is based upon and claims the benefit of priority from Japanese Patent Application No. 2015-110511, filed on May 29, 2015, and Japanese Patent Application No. 2015-110512, filed on May 29, 2015, the entire contents of which are incorporated herein by reference.

FIELD

An embodiment relates to a medical image processing apparatus, a magnetic resonance imaging (MRI) apparatus and a medical image processing method.

BACKGROUND

The MRI apparatus magnetically excites nuclear spins of an object disposed in a static magnet field with a high-frequency (RF: radio frequency) pulse at a Larmor frequency, and reconstructs an image from a magnetic resonance (MR) signal caused by the excitement.

In the case of generating an image for diagnosis using the MRI apparatus, a region of interest (ROI) is required to be set before diagnostic imaging. The ROI is an imaging field, such as an imaging slice or an imaging slab. In order to set the ROI, the MRI apparatus preliminarily performs a locator imaging for positioning, and generates a positioning image. The apparatus then sets the ROI on the positioning image.

For example, the MRI apparatus generates a sagittal section image as the positioning image through cerebral imaging. The MRI apparatus sets a rectangular ROI that has a center position covering the cerebrum and cerebellum on the positioning image and that is arranged parallel to a line connecting nasal spine to a lower end of pons on the positioning image. In the case of setting the ROI in this manner, the ROI and its center line are not always at the nasal spine or the lower end of the pons. Consequently, the position and angle of the ROI with respect to the positioning image is not necessarily appropriate.

To address this problem, there is a method of setting a guide on the positioning image, calculating the ROI having a geometrical relationship with the guide, and displaying the calculated ROI on the positioning image.

According to the conventional technique, the calculated ROI has to be moved in a manner interlocked with an operation of moving the guide on the positioning image. Consequently, the ROI setting efficiency has been low.

BRIEF DESCRIPTION OF THE DRAWINGS

In accompanying drawings,

FIGS. 2A to 2E are diagrams each showing an example of movement information;

FIGS. 3A to 3C are diagrams each showing an example of attribute information table that defines attribute information;

DETAILED DESCRIPTION

A medical image processing apparatus, an MRI apparatus and a medical image processing method according to a present embodiment is described with reference to the accompanying drawings.

The medical image processing apparatus according to the present embodiment includes processing circuitry. The processing circuitry is configured to accept an operation for a region of interest (ROI) GUI and a guide GUI on a screen on which a medical image is displayed, the ROI GUI being for setting a ROI on the medical image, the guide GUI being for guiding a setting of the ROI on the medical image. The processing circuitry is configured to decide whether to move the ROI GUI and the guide GUI in a manner interlocked with each other or not according to a preset condition, when a turning operation or a sliding operation for any one of the ROI GUI and the guide GUI is accepted.

1. First Embodiment

Figure 1:
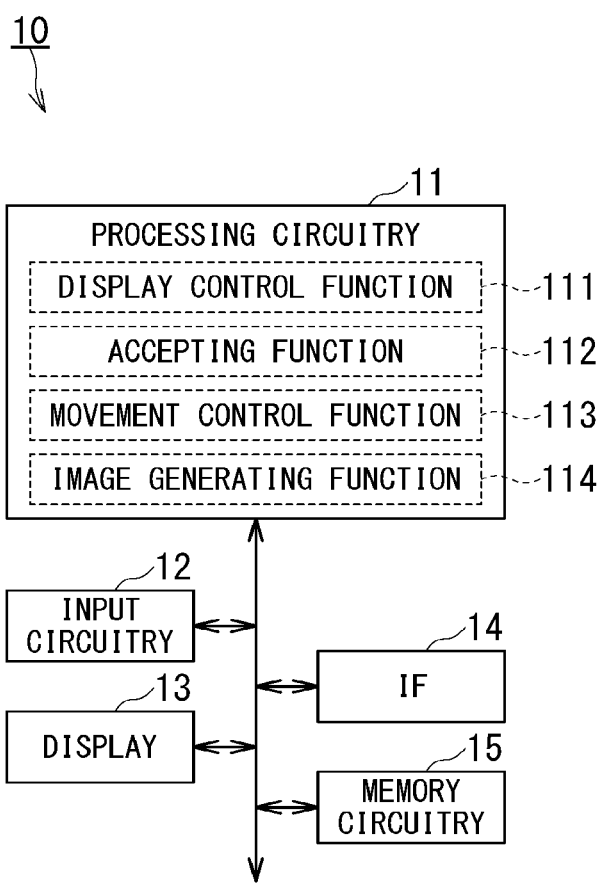
FIG. 1 is a schematic diagram showing a configuration of a medical image processing apparatus according to a first embodiment.

FIG. 1 is a schematic diagram showing a configuration of a medical image processing apparatus according to a first embodiment.

FIG. 1 shows the medical image processing apparatus 10 according to the first embodiment. The medical image processing apparatus 10 sets a ROI on a positioning image generated from medical image data. For example, the medical image processing apparatus 10 sets the ROI on the positioning image generated from volume data that includes three-dimensionally arranged voxel data, using a method described below. The medical image processing apparatus 10 then generates a three-dimensional image of the set ROI from the volume data. The three-dimensional image may be an MPR (multi planar reconstruction) image, a volume rendering image, a surface rendering image or the like. The medical image data which is an original of the positioning image is not necessarily limited to the volume data. For example, the medical image data which is the original of the positioning image is two-dimensional image data, each of pieces of frame data on two-dimensional time-series images, or each of pieces of frame data on three- or four-dimensional time-series images.

The volume data which is an original for setting the ROI is generated by a medical image diagnostic apparatus, such as an MRI apparatus, an X-ray CT (computed tomography) apparatus, an X-ray diagnostic apparatus, or an ultrasonic diagnostic apparatus. Any type of medical image diagnostic apparatuses may be used to generate the volume data. The medical image diagnostic apparatus is also called modality.

The medical image processing apparatus 10 is, for example, a dedicated or general-purpose computer. The medical image processing apparatus 10 is any apparatus including functions 111 to 114, which are described later. For example, the functions of the medical image processing apparatus 10 may be those included in any of a medical image diagnostic apparatus, such as an MRI apparatus, connected via a network, a PC (workstation) that applies image processing to a medical image, and a medical image management apparatus (server) that stores and manages medical images.

The case where the medical image processing apparatus 10 is a dedicated or general-purpose computer is hereinafter described.

The medical image processing apparatus 10 includes processing circuitry 11, input circuitry (input portion) 12, a display (display portion) 13, an IF (communication portion) 14, and memory circuitry (memory) 15.

The processing circuitry 11 means any one of dedicated or general central processing unit (CPU) and a micro processor unit (MPU), an application specific integrated circuit (ASIC), and a programmable logic device. The programmable logic device may be, for example, any one of a simple programmable logic device (SPLD), a complex programmable logic device (CPLD), a field programmable gate array (FPGA) and the like. The processing circuitry 11 reads programs stored in the memory circuitry 15 or directly implemented in the processing circuitry 11, executes these programs, and accomplishes the following functions 111-114.

The processing circuitry 11 may be a single processing circuit or a combination of multiple processing circuits. In the latter case, the memory circuitry 15 includes multiple memory circuits each storing an element of a program, each of the multiple memory circuits is provided for each of the multiple circuits. Alternatively, the memory circuitry 15 includes a single memory circuit storing the program, the single memory circuit is provided for the multiple circuits.

The processing circuitry 11 performs a display control function (display controller) 111, an accepting function (acceptor) 112, a movement control function (movement controller) 113, and an image generating function (image generator) 114. The processing circuitry 11 reads various types of control programs stored in the memory circuitry 15 and performs the functions 111 to 114, and integrally controls processing operations in the components 12 to 15.

The display control function 111 includes a function that obtains or reads the volume data stored in the memory circuitry 15, generates the positioning image generated based on the volume data, and displays the generated image on the display 13. The display control function 111 includes a function that displays, on the display 13, a ROI GUI (graphical user interface) for setting a ROI, and a guide GUI that is a reference for setting the ROI GUI. Both the ROI GUI and the guide GUI are graphical components displayed on the screen, and are turnable and slidable on the screen according to instructions through the input circuitry 12.

The accepting function 112 includes a function that accepts moving operations for the ROI GUI and guide GUI through the input circuitry 12. Each of the moving operations is an operation for changing the initial position of the guide GUI or the ROI GUI on the display screen.

The movement control function 113 is a function of controlling switching of interlocking, thereby deciding whether to move the GUIs. The switching of interlocking is whether to interlock the ROI GUI or not in conformity with a moving operation for the guide GUI. Alternatively, the switching of interlocking is whether to interlock the guide GUI interlock or not in conformity with a moving operation for the ROI GUI.

The image generating function 114 includes a function that generates a three-dimensional image in an ROI after control of the movement by the movement control function 113 on the basis of the volume data obtained by the display control function 111.

The functions 111 to 114 included in the medical image processing apparatus 10 are specifically described with reference to a flowchart shown in FIG. 4.

The input circuitry 12 is a circuit that receives a signal from an input device, such as a pointing device (mouse etc.) or a keyboard, which can be operated by an operator. Here, the input device itself is included in the input circuitry 12. When the input device is operated by the operator, the input circuitry 12 generates an input signal according to the operation and outputs the generated signal to the processing circuitry 11. The medical image processing apparatus 10 may have a touch panel that includes an input device configured integrally with the display 13.

The display 13 may be an LCD (liquid crystal display) or the like. The display 13 displays various pieces of display information, such as various operation screens and image data, on the LCD according to an instruction from the processing circuitry 11.

The IF (interface) 14 performs a communication operation with an external apparatus in conformity with predetermined communication standards. In the case where the medical image processing apparatus 10 is provided on a network, the IF 14 transmits and receives information to and from the external apparatus on the network. For example, the IF 14 receives the volume data obtained through imaging by a medical image diagnostic apparatus (not shown), such as an MRI apparatus, from a medical image diagnostic apparatus or a medical image management apparatus (now shown), and transmits a three-dimensional image generated by the medical image processing apparatus 10 to the medical image management apparatus or a reading terminal (now shown), thus performing the communication operation with the external apparatus.

The memory circuitry 15 may include semiconductor memory elements, such as a RAM (random access memory) and a flash memory, a hard disk, and an optical disk. The memory circuitry 15 may be a portable media, such as a USB (universal serial bus) memory and a DVD (digital video disk). The memory circuitry 15 stores various processing programs (application programs, OS (operating system), etc.) used by the processing circuitry 11, data required to execute the programs, the volume data, and medical images. The OS extensively uses graphics for displaying information for the operator on the display 13, and includes GUIs that allow the input circuitry 12 to receive basic operations.

The memory circuitry 15 also stores pieces of movement information (shown in FIGS. 2A to 2E). Each pieces of movement information includes a condition and a control content indicating whether or not to move a moving target according to a moving operation. The condition is a combination of the moving operation (a moving operation target and a moving operation type) on the display screen and the moving target. The memory circuitry 15 stores an attribute information table (shown in FIGS. 3A to 3C). The attribute information table includes a condition and a control content indicating whether to move the moving target according to the moving operation or not. The condition is attribute information including at least one piece of imaging purpose information (e.g., imaging region information), operator identification information (e.g., an operator ID), and patient identification information (e.g., a patient ID). Here, the imaging purpose information includes the imaging region information indicating an anatomical region of an imaging target. The imaging region information is, for example, on a brain, a knee, a heart, an aortic valve, a pulmonary valve and the like. The imaging purpose information may include information indicating a type of an image, such as a diffusion weighted image (DWI), or indicating a type of an imaging method, such as a time of flight method (TOF).

The medical image processing apparatus 10 controls the movement of the guide GUI and the ROI GUI on the basis of the movement information and the attribute information. Hereinafter, the movement information and the attribute information are sequentially described.

FIGS. 2A to 2E are diagrams each showing an example of movement information.

As shown in FIGS. 2A to 2E, five pieces M1 to M5 of movement information include the moving operation, the moving target, and the control content ("Yes" or No in the diagrams). The moving operation includes the moving operation target, and the moving operation type. Here, moving operation type may be a turning operation and a sliding (translation) operation. The turning operation includes a clockwise turning operation, and an anticlockwise turning operation. The moving operation target is the guide GUI and the ROI GUI. Likewise, the moving target is the guide GUI and the ROI GUI.

The pieces M1 to M5 of movement information have a condition that is a combination of the ROI GUI and the guide GUI as the moving operation targets, the turning operation and the sliding operation as the moving operation types, and the ROI GUI and the guide GUI as the moving targets. Each of the pieces M1 to M5 of movement information defines the control content so as to be in conformity with the condition.

FIG. 2A indicates the first piece M1 of movement information. The first piece M1 of movement information turns the ROI GUI in an interlocked manner according to the turning operation for the guide GUI. The first piece M1 of movement information independently controls sliding of the guide GUI and the ROI GUI according to the sliding operation for the guide GUI and the ROI GUI. In the case where the moving operation target is the guide GUI, the first piece M1 of movement information indicates that the guide GUI is turned, and that the ROI GUI is moved (turned) in the interlocked manner, the GUIs according to the turning operation of the moving operation for the guide GUI on the display screen. The control content of moving is represented as "Yes" in FIG. 2A. That is, the content indicates that when the turning operation for the guide GUI is performed, the ROI GUI is turned in the manner interlocked with the turning. The first piece M1 of movement information indicates that the guide GUI is slid according to the sliding operation of the moving operation for the guide GUI on the display screen, but the ROI GUI is not moved (slid) in the interlocked manner regardless of the present sliding operation. The control content of not moving is represented as "No" in FIG. 2A. That is, the content indicates that even when the slide operation for the guide GUI is performed, the ROI GUI is not slid.

On the other hand, in the case where the moving operation target is the ROI GUI, the first piece M1 of movement information indicates that the ROI GUI is turned according to the turning operation of the moving operation for the ROI GUI on the display screen, but the guide GUI is not moved (turned) in the interlocked manner regardless of the present turning operation. The first piece M1 of movement information indicates that the ROI GUI is slid according to the sliding operation of the moving operation for the ROI GUI on the display screen, but the guide GUI is not moved (slid) in the interlocked manner regardless of the present sliding operation.

According to the first piece M1 of movement information, the turning operation for the ROI GUI on the display screen does not cause the guide GUI to be moved (turned) in the interlocked manner. On the contrary, according to the first piece M1 of movement information, the turning operation for the guide GUI on the display screen causes the ROI GUI to be moved (turned) in the interlocked manner. Consequently, according to the first piece M1 of movement information, the turning operation for the ROI GUI on the display screen creates a difference in angle between the ROI GUI and the guide GUI, and the turning operation for the guide GUI on the display screen turns the ROI GUI while maintaining the difference in angle. Thus, the ROI GUI having a predetermined difference in angle from the guide GUI is easily set.

FIG. 2B indicates the second piece M2 of movement information. The movement information M2 indicates that the guide GUI is turned, and that the ROI GUI is moved (turned) in the interlocked manner, the GUIs according to the turning operation of the moving operation for the guide GUI on the display screen. The second piece M2 of movement information indicates that the guide GUI is slid according to the sliding operation of the moving operation for the guide GUI on the display screen, but the ROI GUI is not moved (slid) in the interlocked manner regardless of the present sliding operation.

The second piece M2 of movement information indicates that the ROI GUI is turned, and that the guide GUI is moved (turned) in the interlocked manner, the GUIs according to the turning operation of the moving operation for the ROI GUI on the display screen. The second piece M2 of movement information indicates that the ROI GUI is slid according to the sliding operation of the moving operation for the ROI GUI on the display screen, but the guide GUI is not moved (slid) in the interlocked manner regardless of the present sliding operation.

According to the pieces M1 and M2 of movement information, the turning operation for the guide GUI on the display screen causes the ROI GUI to be moved (turned) in the interlocked manner. On the contrary, according to the pieces M1 and M2 of movement information, the sliding operation for the ROI GUI on the display screen does not cause the guide GUI to be moved (slid) in the interlocked manner. Consequently, according to the pieces M1 and M2 of movement information, even when the turning operation for the guide GUI arranged with reference to a reference point turns the ROI GUI to set the angle of the ROI GUI and then the sliding operation is applied to the ROI GUI, a position of the guide GUI is unchanged, the position being after the turning operation. In this manner, according to the pieces M1 and M2 of movement information, it is possible for the operator to check whether the angle of the turned ROI GUI is appropriate or not while viewing the display screen.

FIG. 2C indicates the third piece M3 of movement information. The third piece M3 of movement information indicates that the guide GUI is turned, and that the ROI GUI is moved (turned) in the interlocked manner, the GUIs according to the turning operation of the moving operation for the guide GUI on the display screen. The third piece M3 of movement information indicates that the guide GUI is slid, and that the ROT GUI is moved (slid) in the interlocked manner, the GUIs according to the sliding operation of the moving operation for the guide GUI on the display screen.

The third piece M3 of movement information indicates that the ROI GUI is turned, and that the guide GUI is moved (turned) in the interlocked manner, the GUIs according to the turning operation of the moving operation for the ROI GUI on the display screen. The third piece M3 of movement information indicates that the ROI GUI is slid, and that the guide GUI is moved (slid) in the interlocked manner, the GUIs according to the sliding operation of the moving operation for the ROI GUI on the display screen.

FIG. 2D indicates the fourth piece M4 of movement information. The fourth piece M4 of movement information indicates that the guide GUI is turned, and that the ROI GUI is moved (turned) in the interlocked manner, the GUIs according to the turning operation of the moving operation for the guide GUI on the display screen. The fourth piece M4 of movement information indicates that the guide GUI is slid, and the ROI GUI is moved (slid) in the interlocked manner, the GUIs according to the sliding operation of the moving operation for the guide GUI on the display screen.

The fourth piece M4 of movement information indicates that both of the ROI GUI and the guide GUI are not moved (turned) in the interlocked manner regardless of the present turning operation for the ROI GUI. The fourth piece M4 of movement information indicates that both of the ROI GUI and the guide GUI are not moved (slid) in the interlocked manner regardless of the present sliding operation for the ROI GUI.

FIG. 2E indicates the fifth piece M5 of movement information. The fifth piece M5 of movement information indicates that the guide GUI is turned according to the turning operation of the moving operation for the guide GUI on the display screen, but the ROI GUI is not moved (turned) in the interlocked manner regardless of the present turning operation. The fifth piece M5 of movement information indicates that the guide GUI is slid according to the sliding operation of the moving operation for the guide GUI on the display screen, but the ROI GUI is not moved (slid) in the interlocked manner regardless of the present sliding operation.

The fifth piece M5 of movement information indicates that the ROI GUI is turned according to the turning operation of the moving operation for the ROI GUI on the display screen, but the guide GUI is not moved (turned) in the interlocked manner regardless of the present turning operation. The fifth piece M5 of movement information indicates that the ROI GUI is slid according to the sliding operation of the moving operation for the ROI GUI on the display screen, but the guide GUI is not moved (slid) in the interlocked manner regardless of the present sliding operation.

Next, the attribute information is described. FIGS. 3A to 3C are diagrams each showing an example of attribute information table that defines the attribute information.

FIG. 3A shows an attribute information table T1 that associates types of the pieces of movement information with imaging region information, which is attribute information. The attribute information table T1 includes the imaging region information, which is for example four imaging regions, i.e., "Brain", "Knee", "Aortic Valve/Pulmonary Valve", and "Heart".

The attribute information tables T1 to T3 have, as a condition, at least one of pieces of the attribute information, which are the imaging purpose information, the operator identification information, and the patient identification information. The attribute information tables T1 to T3 define the control content so as to be in conformity with the condition. Here, the pieces M1 to M5 of movement information are assigned in conformity with the condition, thereby defining the control content.

For example, "Movement Information" in the attribute information table T1 defines that in the case where the imaging region information indicates "Brain", the first piece M1 of movement information shown in FIG. 2A is assigned. Likewise, in the case where the imaging region information is "Knee", the second piece M2 of movement information shown in FIG. 2B is assigned. In the case of "Aortic Valve/Pulmonary Valve", the third piece M3 of movement information shown in FIG. 2C is assigned. In the case of "Heart", the four piece M4 of movement information shown in FIG. 2D is assigned.

FIG. 3B shows an attribute information table T2 that associates the types of the pieces of movement information with the operator identification information, which is the attribute information. The attribute information table T2 includes, for example, three operators "○1" to "○3" as the operator identification information. For example, the operator "○1" is assigned the first piece M1 of movement information shown in FIG. 2A. The operator "○2" is assigned the second piece M2 of movement information shown in FIG. 2B. The operator "○3" is assigned the first piece M1 of movement information shown in FIG. 2A.

FIG. 3C shows an attribute information table T3 that associates the types of the pieces of movement information with the patient identification information, which is the attribute information. The attribute information table T3 includes, for example, three patients "P1" to "P3" as the patient identification information. For example, the patient "P1" is assigned the first piece M1 of movement information shown in FIG. 2A. The patient "P2" is assigned the second piece M2 of movement information shown in FIG. 2B. The patient "P3" is assigned the third piece M3 of movement information shown in FIG. 2C.

The attribute information tables T1 to T3 may include information on the relative position and offset angle of a ROI GUI R on an initial display screen (shown in FIG. 5) associated with the attribute information. The relative position of the ROI GUI R is a relative position of a center position of the ROI GUI R with reference to a position (center position or the like) of the guide GUI G on the initial display screen.

The offset angle of the ROI GUI R is a relative angle of an ROI GUI R with reference to an angle of the guide GUI G on the initial display screen. In the case where the ROI GUI R is a slice or a slab, a difference between an inclination angle of the slice or slab and an inclination angle of the guide GUI G is the offset angle.

Figure 5:
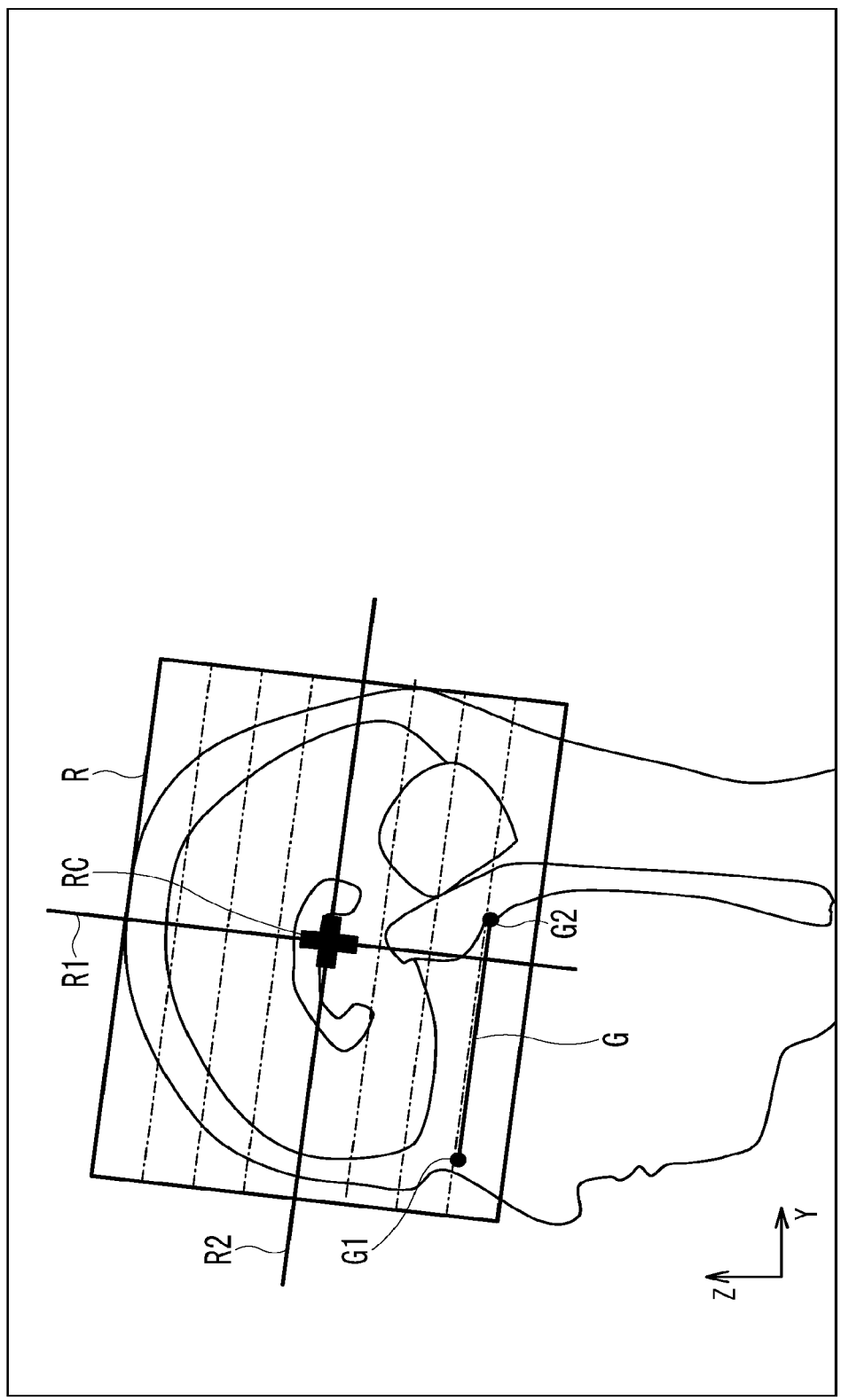
FIG. 5 is a diagram showing an initial display screen that includes a positioning image including a brain, an ROT GUI, and a guide GUI.

As the attribute information, the attribute information table T1 shown in FIG. 3A is referred to. Furthermore, in the case where the imaging region information is "Brain", "Relative Position of ROI GUI" is (x1, y1, z1) and "Offset Angle of ROI GUI" is 0° in FIG. 3A. In this case, as shown in FIG. 5, the ROI GUI R on the initial display screen has the center position RC at the relative position (y0+y1, z0+z1) with reference to the center position (y0, z0) of the guide GUI G, and has the inclination angle of the ROI GUI R (the inclination angle of the slab R) as 0° with reference to the angle of the guide GUI G. That is, the ROI GUI R and the guide GUI G are parallel to each other on the initial display screen.

The attribute information may only include one of the pieces of information, which are the imaging region information, the operator identification information, and the patient identification information. That is, the movement information may be associated with a combination of the imaging region information, the operator identification information and the patient identification information.

Subsequently, functions of the medical image processing apparatus 10 according to the first embodiment are specifically described.

Figure 4:
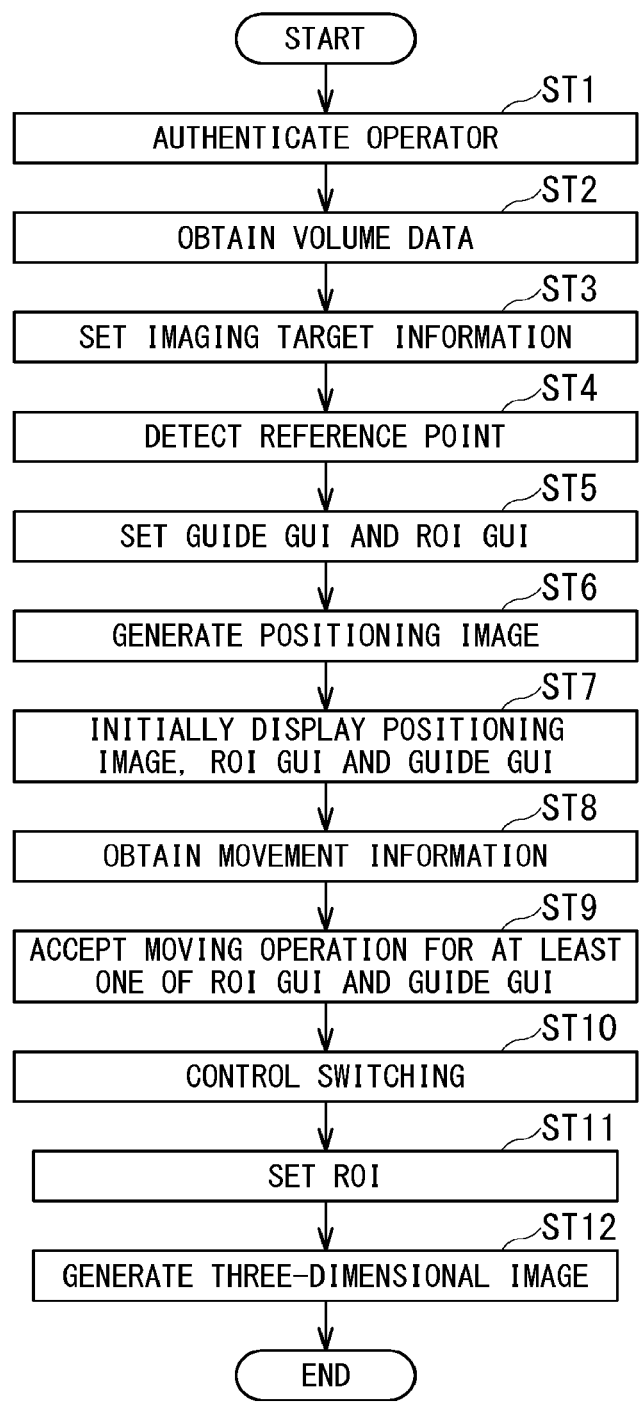
FIG. 4 is a flowchart for specifically describing functions of the medical image processing apparatus according to the first embodiment.

FIG. 4 is a flowchart for specifically describing the functions of the medical image processing apparatus 10 according to the first embodiment.

The identification information (ID: identification) of the operator, the password and the like are input through the input circuitry 12 by the operator, thereby allowing the display control function 111 of the medical image processing apparatus 10 to authenticate the operator (step ST1).

As described above, the memory circuitry 15 stores the volume data generated by the medical image diagnostic apparatus, such as the MRI apparatus, the X-ray CT apparatus, the X-ray diagnostic apparatus, and the ultrasonic diagnostic apparatus.

When desired volume data is designated through the input circuitry 12, the display control function 111 obtains or reads the designated volume data from the memory circuitry 15 (step ST2).

The display control function 111 sets the imaging region information (imaging region to be imaged) in the volume data obtained by the display control function 111 (step ST3). The setting of the imaging region information in step ST3 may be performed automatically on the basis of supplementary information in the volume data, or performed on the basis of information input through the input circuitry 12.

The display control function 111 detects the reference point on the basis of the volume data obtained in step ST2 (step ST4). It may be configured such that the reference point detected in step ST4 is different according to the type of the imaging region information set in step ST3. For example, in the case where the imaging region information is the brain, characteristic imaging regions, which are a nasal spine G1, a lower end of pons G2 (shown in FIG. 5) and the like, are detected as the reference point.

It is possible to detect the reference point using, for example, a template matching method. For example, shapes of anatomical characteristic imaging regions of the head, such as the nasal spine G1 and the lower end of pons G2 (shown in FIG. 5), are preliminarily stored as templates, and matching between the templates and the volume data allows the positions of the nasal spine G1 and the lower end of pons G2 to be automatically detected. However, the reference point is not necessarily detected by the template matching method. For example, a classifier is preliminarily configured through machine learning from a neighboring image pattern around the characteristic imaging region in the brain, and the characteristic imaging region in the volume data may be detected using this classifier.

The display control function 111 sets the guide GUI including the reference point detected in step ST4 while setting the ROI GUI (step ST5). In step ST5, the display control function 111 automatically sets the ROI GUI on the basis of the relative position and the offset angle with reference to the guide GUI, which are defined in the attribute information tables T1 to T3 as described above, and on the thickness and number of slices and the thickness of the slab, having been set through the input circuitry 12.

The display control function 111 generates the positioning image from the volume data obtained in step ST2 (step ST6). For example, the display control function 111 generates, from the volume data, the two-dimensional sectional view including the guide GUI set in step ST5 (e.g., a sagittal image including the guide GUI), and adopts this image as the positioning image. The display control function 111 initially displays, on the display 13, the positioning image generated in step ST6, and the guide GUI and the ROI GUI set in step ST5 (step ST7).

Here, in the case where the ROI GUI is for example a region including the brain, the guide GUI set in step ST5 is a line including the nasal spine and the lower end of pons, a line segment connecting the nasal spine and the lower end of pons or the like. The ROI GUI set in step ST5 is one or more sections (slices) set in a region including the brain or, for example, a rectangular parallelepiped-shaped region (slab). The ROI GUI initially displayed on the positioning image generated in step ST6 is set at an initial position having a predetermined relative positional relationship with respect to the position of the guide GUI.

FIG. 5 is a diagram showing an initial display screen that includes the positioning image including the brain, the ROI GUI, and the guide GUI.

FIG. 5 thus shows the positioning image based on the volume data including the brain, and is, for example, the sagittal image (cross-section image) of a Y-Z section including the brain. The ROI GUI R and the guide GUI G are displayed on the sagittal image. The guide GUI G is a line (section) including the reference point detected in step ST4. Here, in the case of the sagittal image including the brain, it is preferred that the detected reference points be the nasal spine G1 and the lower end of pons G2. However, the configuration is not limited thereto. For example, the reference point may be an anterior commissure and a posterior commissure.

The center position RC of the ROI GUI R may be set in the characteristic imaging region detected based on the volume data, set at the center of three or four reference points, or determined on the basis of the position of the guide GUI G. In the case of setting based on the position of the guide GUI G, the center position RC is determined on the basis of a point on the guide GUI G, e.g., a reference point G1, a reference point G2 or the midpoint of the reference points G1 and G2, and of a preset relative position. For example, in the case where the position (Y, Z) of the midpoint of the reference points G1 and G2 is (y0, z0) and the preset relative position (Y, Z) is (yn, zn), the center position RC is determined as (y0+yn, z0+zn). The preset relative position (yn, zn) may be determined on the basis of the attribute information as shown in FIGS. 3A to 3C.

The angle of the ROI GUI R is determined on the basis of the angle of the guide GUI G. For example, the ROI GUI R includes a side having an offset angle θ preset from the guide GUI G. In the example shown in FIG. 5, the ROI GUI R has a rectangular shape including a side (offset angle θ=0) parallel to the guide GUI G. The center lines R1 and R2 of the ROI GUI may be displayed together with the ROI GUI R. The preset offset angle θ may be determined on the basis of the attribute information as shown in FIGS. 3A to 3C.

The positioning image initially displayed in step ST7 shown in FIG. 4 may be the sagittal image shown in FIG. 5, an X-Y section axial image, an X-Z section coronal image or an oblique section image. The positioning image to be initially displayed may be images selected from among the sagittal image, axial image, coronal image, and oblique section image. The oblique section image is a section image at any angle that is other than orthogonal three sections. The oblique section image may generated from any image obtained from the orthogonal three sections or the volume data, or an image obtained by imaging at any angle. For example, the oblique section image may be an image of a section passing through any three points among the nasal spine, the lower end of pons, the anterior commissure and the posterior commissure, or an image of a section having the minimum distances from these four points.

Returning to the description on FIG. 4, the accepting function 112 refers to the attribute information (e.g., any of the attribute information tables T1 to T3 shown in FIGS. 3A to 3C) stored in the memory circuitry 15. The accepting function 112 obtains the movement information indicating whether to move the guide GUI and the ROI GUI or not (e.g., any of pieces M1 to M5 of movement information shown in FIGS. 2A to 2E) (step ST8).

The accepting function 112 accepts the moving operation for at least one of the ROI GUI and the guide GUI through the input circuitry 12 (step ST9). The movement control function 113 controls switching of whether to move the guide GUI and the ROI GUI or not according to the moving operation of the moving operation target on the basis of the movement information obtained in step ST8 (or movement information after change in step ST10d shown in FIG. 6) (step ST10).

Here, functions in step ST10 are specifically described.

Figure 6:
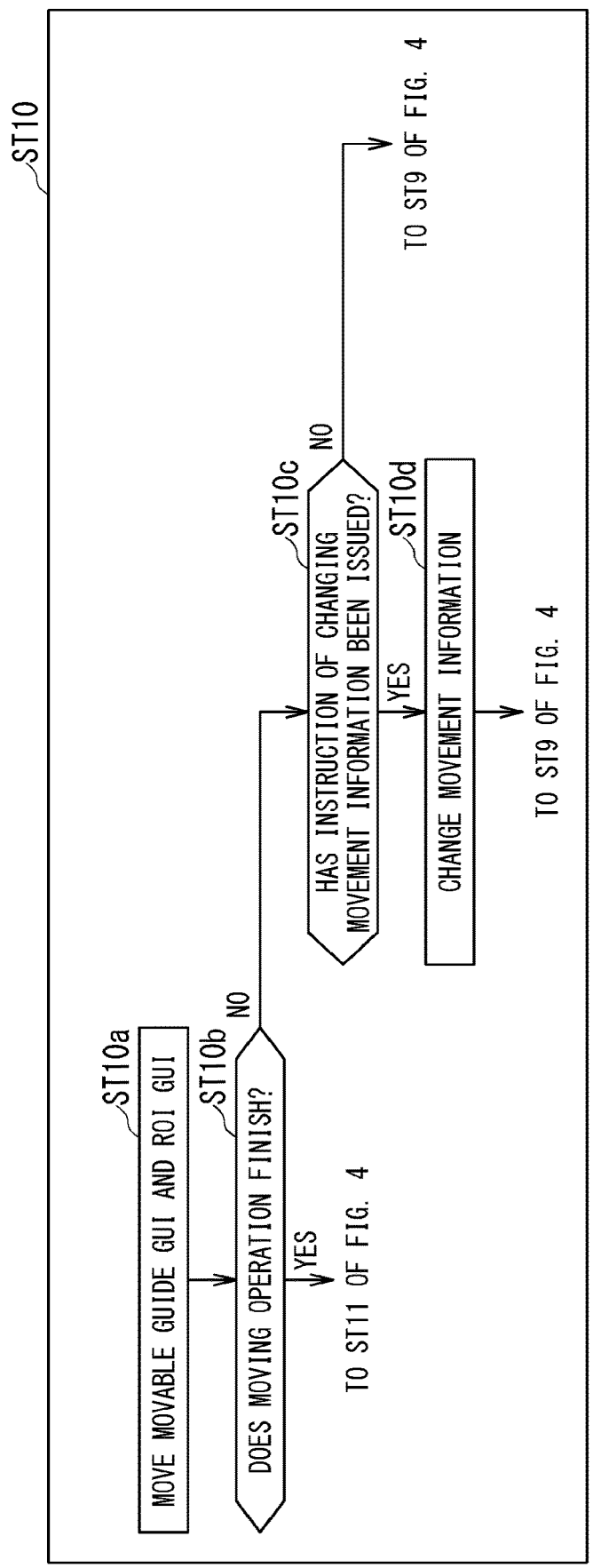
FIG. 6 is a flowchart specifically showing functions in step ST10 shown in FIG. 4.

FIG. 6 is a flowchart specifically showing the functions in step ST10 shown in FIG. 4.

The movement control function 113 determines whether to move the guide GUI and the ROI GUI on the display screen on the basis of the movement information obtained in step ST8 shown in FIG. 4 (or movement information after change in step ST10d). The movement control function 113 moves the movable guide GUI and ROI GUI on the display screen (step ST10a).

Here, movement of the guide GUI and the ROI GUI in the case of the first piece M1 of movement information shown in FIG. 2A is described using display screens shown in FIGS. 7 to 10.

Figure 7:
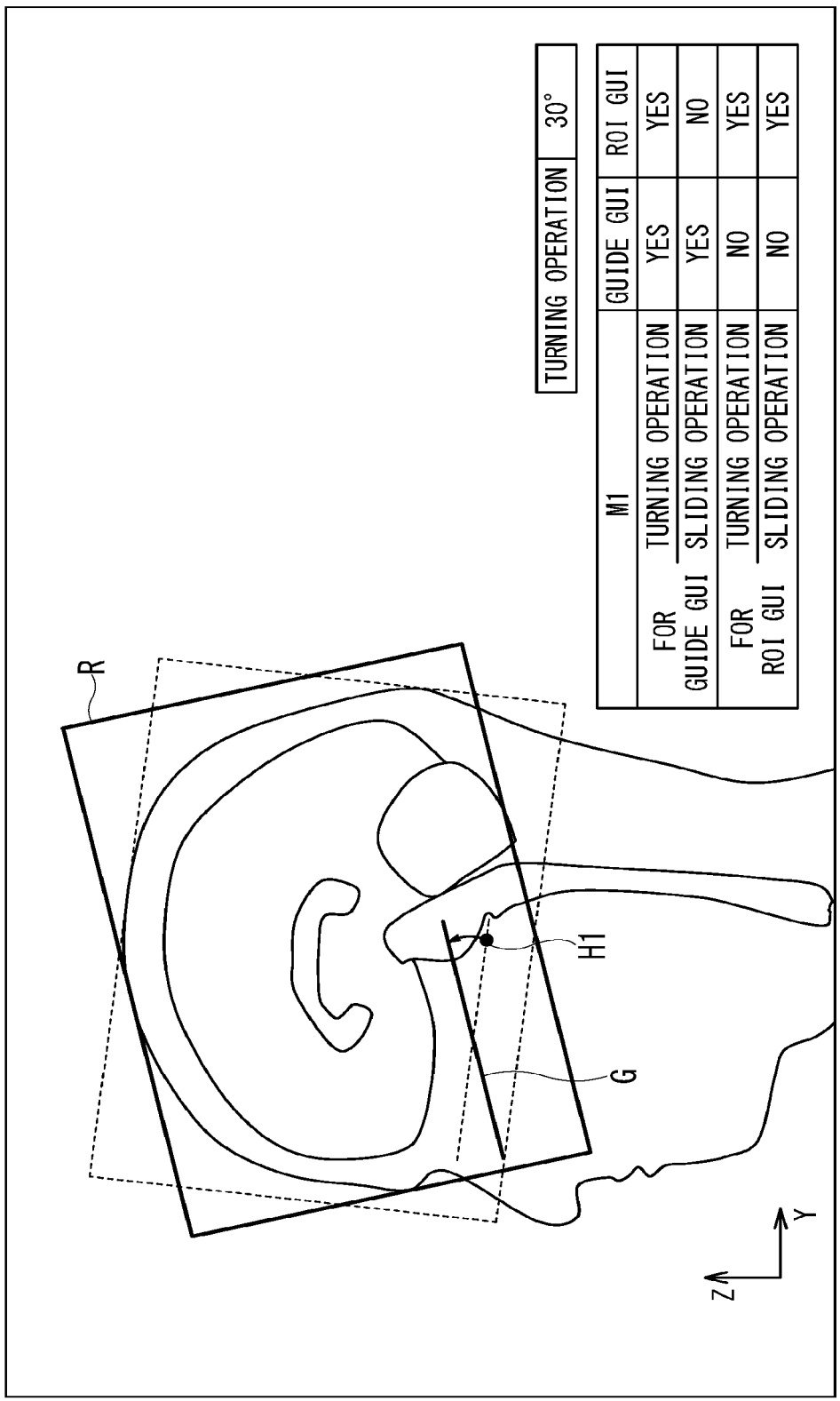
FIG. 7 is a diagram showing a display screen for illustrating the ROI GUI that turns in the manner interlocked with a turning operation for the guide GUI.

FIG. 7 is a diagram showing the display screen for illustrating the ROI GUI that turns in the manner interlocked with the turning operation for the guide GUI.

When the guide GUI G is subjected to the turning operation on the initial display screen shown in FIG. 5, the guide GUI G is turned centered on its center position and the ROI GUI R is turned in the interlocked manner centered on its center position by an amount of turning of the guide GUI G as shown in FIG. 7. In FIG. 7, the guide GUI G and ROI GUI R before being turned are indicated by broken lines, and the guide GUI G and ROI GUI R after being turned are indicated by solid lines. For example, the turning operation for the guide GUI G is achieved by designating a portion H1 that is other than the center position of the guide GUI G before the turn, then moving the portion H1 while keeping the portion H1 designated, and canceling the designation at a desired angle. That is, the turning operation for the guide GUI G is achieved by a drag-and-drop operation.

The display screen shown in FIG. 7 may include information representing the content of the first piece M1 of movement information shown in FIG. 2A. The content of the first piece M1 of movement information is represented as character information, thereby allowing the operator to view whether the guide GUI G and the ROI GUI R are moved or not according to the moving operation for the guide GUI G on the display screen.

Furthermore, the display screen shown in FIG. 7 may include the relative angle (30°) of the guide GUI G with reference to the initial angle of the guide GUI G after the turning operation.

Figure 8:
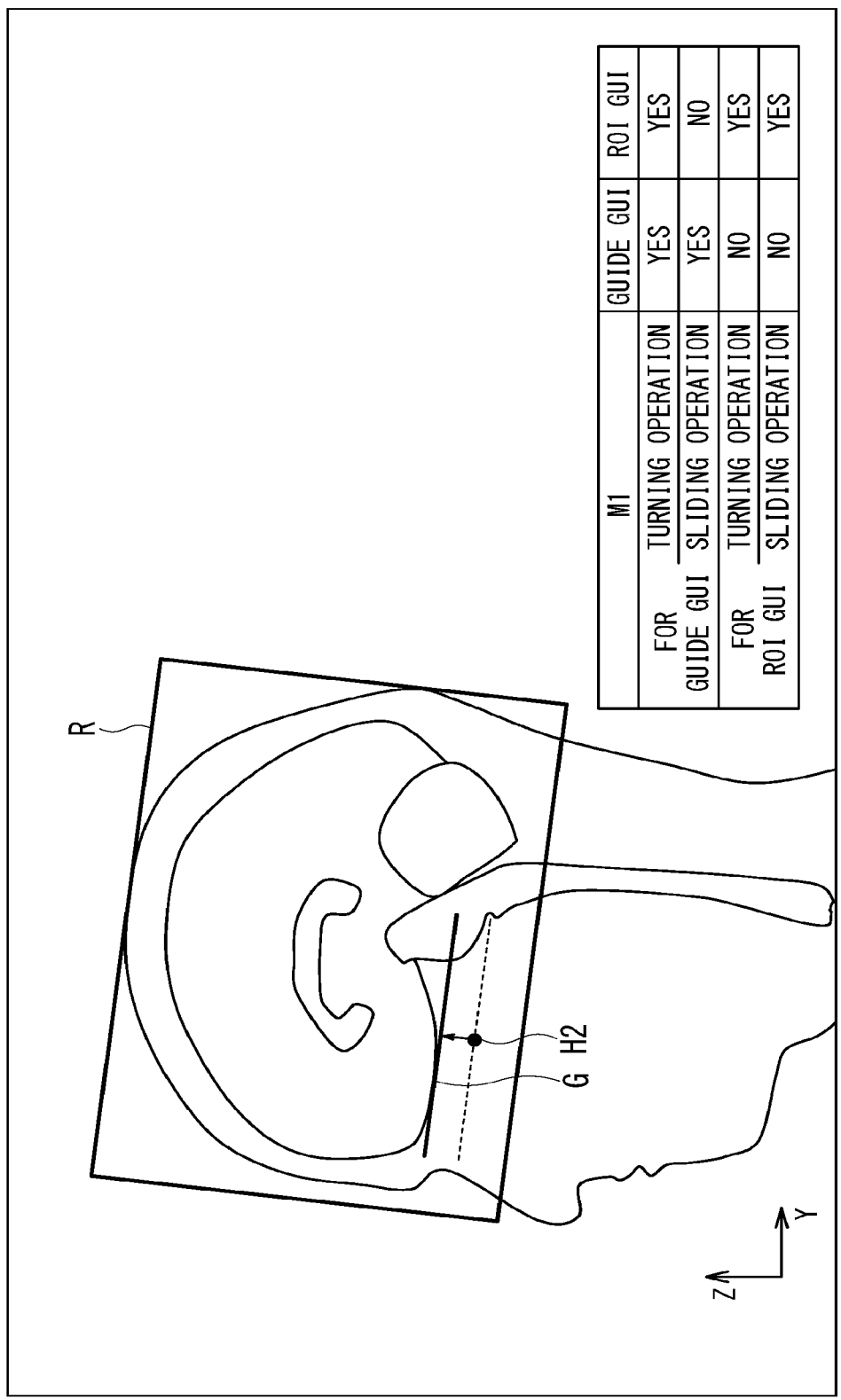
FIG. 8 is a diagram showing a display screen for illustrating the ROI GUI that is not interlocked with a sliding operation for the guide GUI.

FIG. 8 is a diagram showing the display screen for illustrating the ROI GUI that is not interlocked with the sliding operation for the guide GUI.

When the guide GUI G is subjected to the sliding operation on the initial display screen shown in FIG. 5, the guide GUI G is slid but the ROI GUI R is not slid, as shown in FIG. 8. In FIG. 8, the guide GUI G before being slid is indicated by a broken line, and the guide GUI G after being slid is indicated by a solid line. For example, the sliding operation for the guide GUI G is achieved by designating a portion H2 at the center position of the guide GUI G before the sliding, then moving the portion H2 while keeping the portion H2 designated, and canceling the designation at a desired angle. That is, the sliding operation for the guide GUI G is achieved by a drag-and-drop operation.

The display screen shown in FIG. 8 may include information representing the content of the first piece M1 of movement information shown in FIG. 2A. The content of the first piece M1 of movement information is represented as character information, thereby allowing the operator to view whether the guide GUI G and the ROI GUI R are moved or not according to the moving operation for the guide GUI G on the display screen.

In the display screens shown in FIGS. 7 and 8, the content of the first piece M1 of movement information may be represented by information other than character information. For example, while the portions H1 and H2 are designated before movement, a line indicating the guide GUI G and lines indicating the ROI GUI R may be represented by the attribute information (at least one pieces of information among hue information, lightness information, and chroma saturation information) having colors in conformity with the content of the movement information.

For example, according to the first piece M1 of movement information, the turning operation for the guide GUI G turns the guide GUI G and the ROI GUI R. Consequently, while the portion H1 (shown in FIG. 7) is designated before the turn, lines indicating the guide GUI G and the ROI GUI R are represented in blue. For example, according to the first piece M1 of movement information, the sliding operation for the guide GUI G slides the guide GUI G but sliding of the ROI GUI R is prohibited. Consequently, while the portion H2 (shown in FIG. 8) at the center position of the guide GUI G is designated before sliding, the line indicating the GUI G is represented in blue and the lines indicating the ROI GUI R are represented in red. The content of the movement information is represented, thereby allowing the operator to view whether the guide GUI G and the ROI GUI R are moved or not according to the moving operation for the guide GUI G and the ROI GUI R on the display screen.

Figure 9:
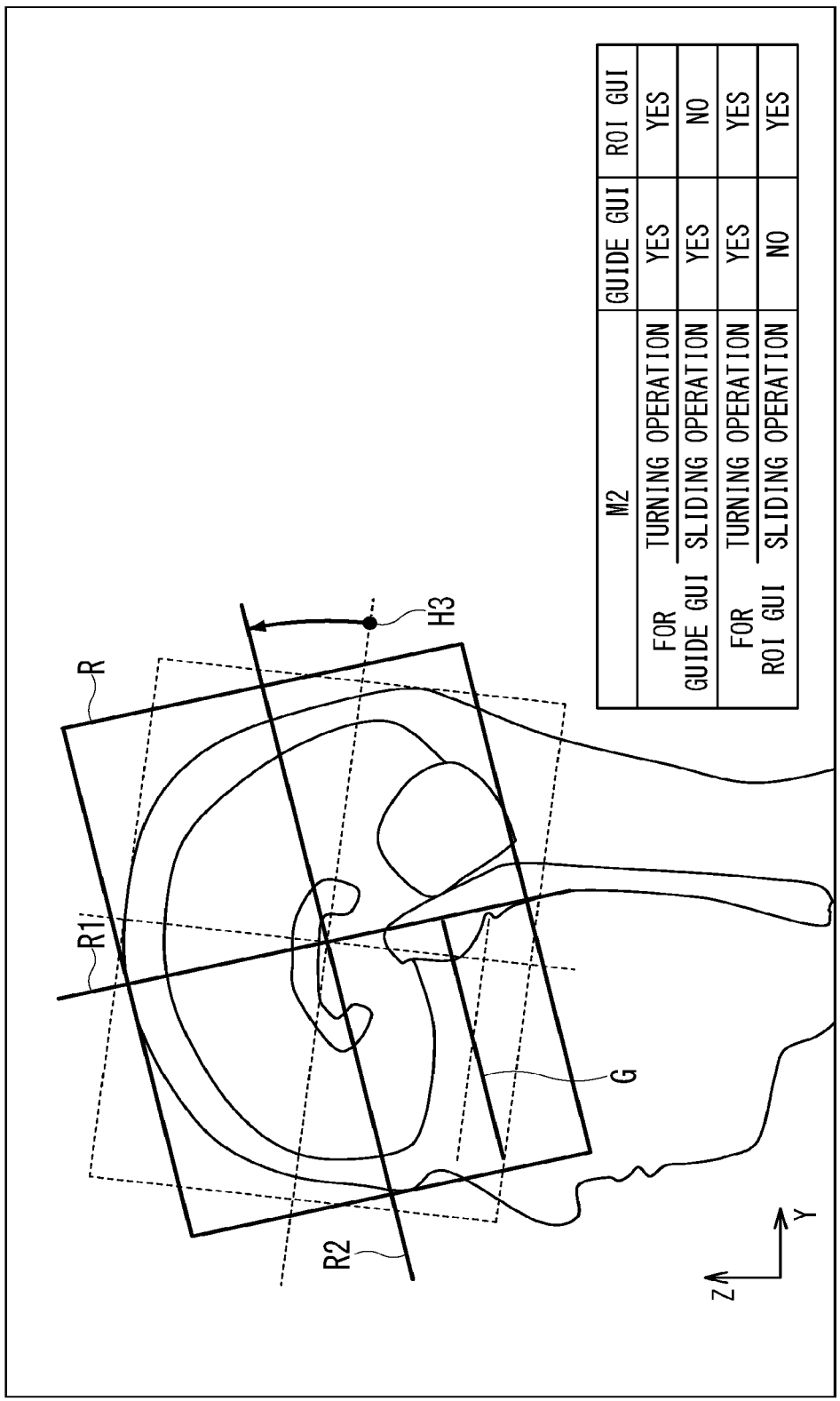
FIG. 9 is a diagram showing a display screen for illustrating the guide GUI that turns in the manner interlocked with a turning operation for the ROI GUI.

FIG. 9 is a diagram showing the display screen for illustrating the guide GUI that turns in the manner interlocked with the turning operation for the ROI GUI.

When the ROI GUI R on the initial display screen shown in FIG. 5 is subjected to the turning operation, the ROI GUI R is turned centered on its center position and the guide GUI G is turned in the interlocked manner centered on its center position by an amount of turning of the ROI GUI R as shown in FIG. 9. In FIG. 9, the ROI GUI R and guide GUI G before being turned are indicated by broken lines, and the ROI GUI R and guide GUI G after being turned are indicated by solid lines. For example, the turning operation for the ROI GUI R is achieved by designating a portion H3 on the center line R2 (or the center line R1) before the turn, then moving the portion H3 while keeping the portion H3 designated, and canceling the designation at a desired angle. That is, the turning operation for the ROI GUI R is achieved by a drag-and-drop operation.

The display screen shown in FIG. 9 may include information representing the content of the second piece M2 of movement information shown in FIG. 2B. The content of the second piece M2 of movement information is represented as character information, thereby allowing the operator to view whether the ROI GUI R and the guide GUI G are moved or not according to the moving operation for the ROI GUI R on the display screen.

Figure 10:
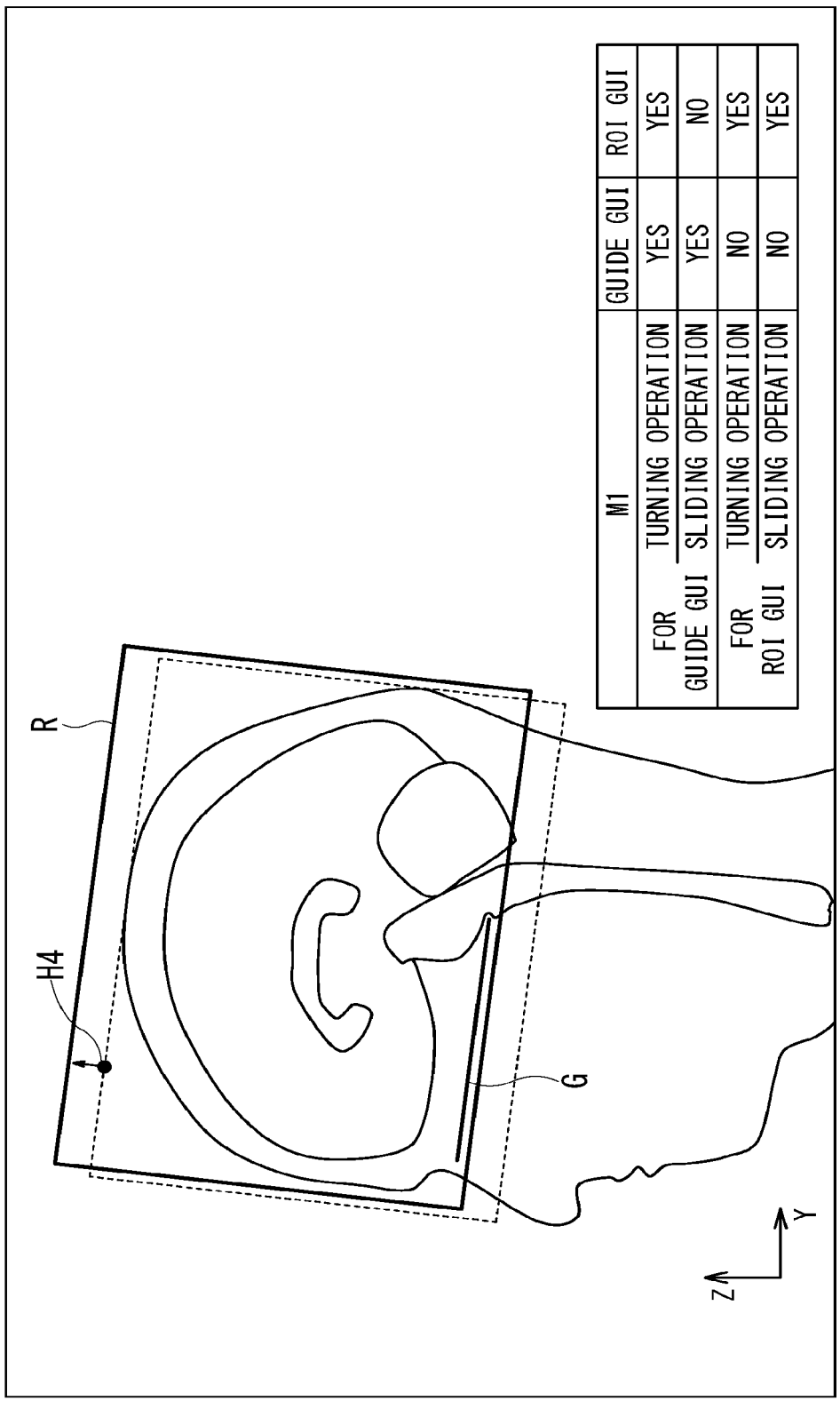
FIG. 10 is a diagram showing a display screen for illustrating the guide GUI that is not interlocked with a sliding operation for the ROI GUI.

FIG. 10 is a diagram showing the display screen for illustrating the guide GUI that is not interlocked with the sliding operation for the ROI GUI.

When the guide ROI GUI R on the initial display screen shown in FIG. 5 is subjected to the sliding operation, the ROI GUI R is slid but the guide GUI G is not slid, as shown in FIG. 10. In FIG. 10, the ROI GUI R before being slid is indicated by broken lines, and the ROI GUI R after being slid is indicated by solid lines. For example, the sliding operation for the ROI GUI R is achieved by designating a portion H4 that is a frame of the ROI GUI R before being slid, then moving the portion H4 while keeping the portion H4 designated, and canceling the designation at a desired angle. That is, the sliding operation for the ROI GUI R is achieved by a drag-and-drop operation.

The display screen shown in FIG. 10 may include information representing the content of the first piece M1 of movement information shown in FIG. 2A. The content of the first piece M1 of movement information is represented as character information, thereby allowing the operator to view whether the guide GUI G and the ROI GUI R are moved or not according to the moving operation for the ROI GUI R on the display screen.

Returning to the description on FIG. 6, the movement control function 113 determines whether to finish the moving operation or not (step ST10b). In the case of YES in the determination in step ST10b, that is, in the case where it is determined to finish the moving operation, the movement control function 113 advances the processing to step ST11 shown in FIG. 4, and sets the ROI.

On the contrary, in the case of NO in the determination in step ST10b, that is, in the case where it is determined that the moving operation is not finished, the movement control function 113 determines whether an instruction of changing the movement information has been issued through the input circuitry 12 or not (step ST10c). In the case of YES in the determination in step ST10c, that is, in the case where it is determined that the instruction of changing the movement information has been issued, the movement control function 113 changes the movement information according to the instruction of changing the movement information (step ST10d). For example, the movement control function 113 changes the movement information from the first piece M1 to the second piece M2. Next, the movement control function 113 returns the processing to step ST9 shown in FIG. 4, and accepts the moving operation for the ROI GUI and guide GUI through the input circuitry 12.

On the contrary, in the case of NO in the determination in step ST10c, that is, in the case of determining that the instruction of changing the movement information has not been issued, the movement control function 113 leaves the movement information unchanged, and returns the processing to step ST9 shown in FIG. 4, and accepts the moving operation for ROI GUI and guide GUI through the input circuitry 12.

Returning to the description on FIG. 4, the guide GUI or the ROI GUI on the display screen is subjected to the moving operation according to the control in step ST10, thereby allowing the movement control function 113 to set the ROI (step ST11).

The image generating function 114 generates the three-dimensional image of the ROI set in step ST11 on the basis of the volume data obtained in step ST2 (step ST12).

The method of setting the ROI on the positioning image pertaining to the "Brain" in the imaging region information shown in FIG. 5 has thus been described. However, the imaging region information is not limited to the case of the "Brain". Alternatively, the imaging region information may be, for example, on any of "Knee", "Aortic Valve/Pulmonary Valve" and "Heart". The method of setting the ROI in these cases is described.

Figure 11:
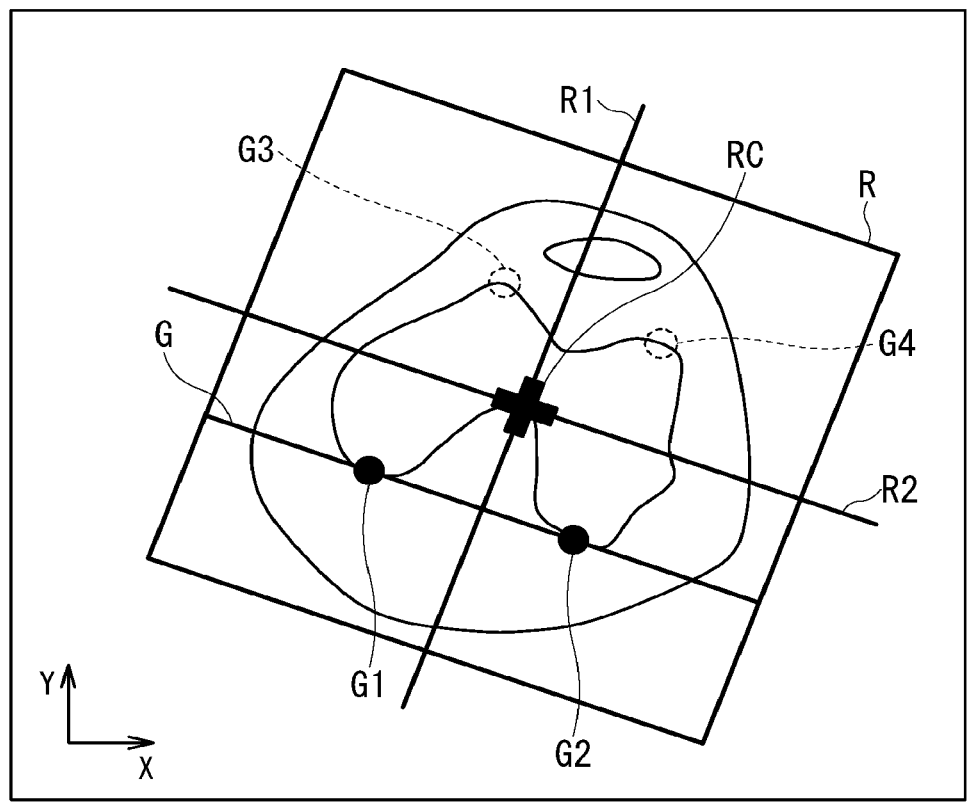
FIG. 11 is a diagram showing an initial display screen that includes the positioning image including a knee, the ROI GUI, and the guide GUI.

FIG. 11 is a diagram showing an initial display screen that includes the positioning image including the knee, the ROI GUI, and the guide GUI.

FIG. 11 shows the positioning image generated from volume data including the knee, and is, for example, an axial image of X-Y section including the knee. The ROI GUI R and the guide GUI G are displayed on the axial image. The guide GUI G is, for example, a line segment including the reference point detected in step ST4. Here, in the case of the axial image including the knee, it is preferred that the detected reference points be a lower end of inner condyle of femur G1 and a lower end of outer condyle of femur G2. However, the configuration is not limited thereto. For example, the reference point may be an upper end of inner condyle of femur G3 and an upper end of outer condyle of femur G4.

The center position RC of the ROI GUI R may be set in the characteristic imaging region (the center of the femur region) detected based on the volume data, set at the center of three or four reference points, or determined on the basis of the position of the guide GUI G. In the case of setting based on the position of the guide GUI G, the center position RC is determined on the basis of a point on the guide GUI G, e.g., a reference point G1, a reference point G2 or the midpoint of the reference points G1 and G2, and of a preset relative position. For example, in the case where the position (X, Y) of the midpoint of the reference points G1 and G2 is (x0, y0) and the preset relative position (Y, Z) is (xn, yn), the position of the center position RC is determined as (x0+xn, y0+yn). The preset relative position (xn, yn) may be determined on the basis of the attribute information as shown in FIGS. 3A to 3C.

The angle of the ROI GUI R is determined on the basis of the angle of the guide GUI G. For example, the ROI GUI R includes a side having an offset angle θ preset from the guide GUI G. In the example shown in FIG. 11, the ROI GUI R has a rectangular shape including a side (offset angle θ=0)

parallel to the guide GUI G. The center lines R1 and R2 of the ROI GUI R may be displayed together with the ROI GUI R. The preset offset angle θ may be determined on the basis of the attribute information as shown in FIGS. 3A to 3C.

The positioning image initially displayed in step ST7 shown in FIG. 4 may be the axial image shown in FIG. 11, a sagittal image, a coronal image or an oblique section image. The positioning image to be initially displayed may be images selected from among the sagittal image, axial image, coronal image, and oblique section image.

In the case where the attribute information table T1 in FIG. 3A is referred to and the imaging region information is "Knee", the movement control function 113 obtains the second piece M2 of movement information in step ST8. In this case, the interlock relationship between the guide GUI and the ROI GUI may be defined by the second piece M2 of movement information.

Figure 12:
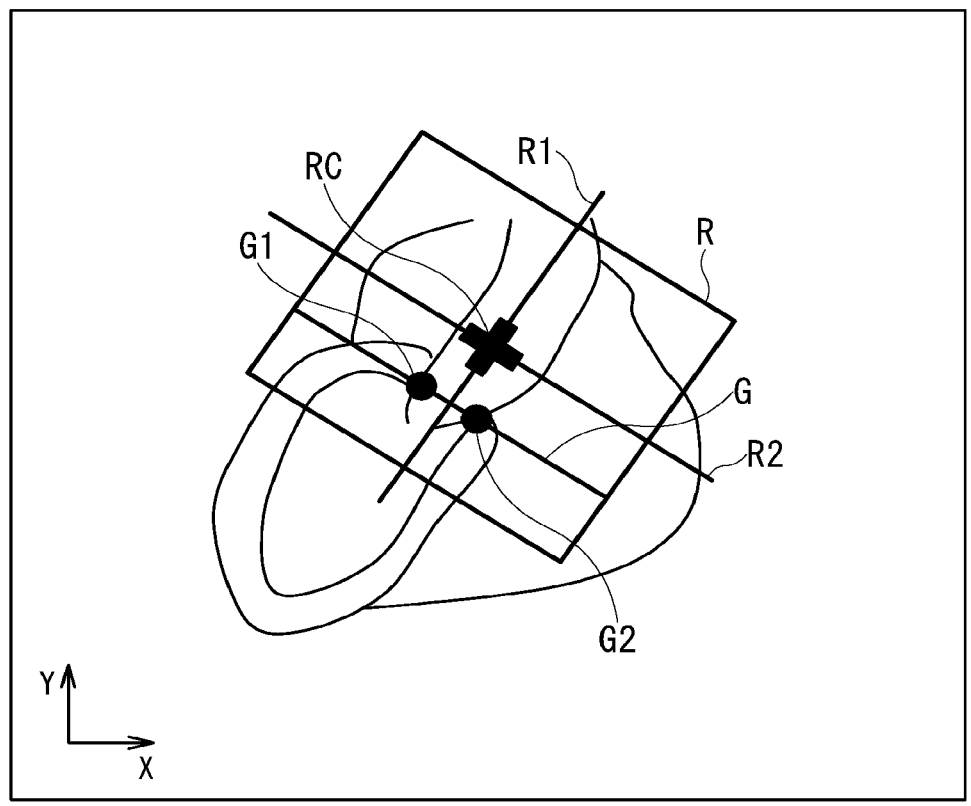
FIG. 12 is a diagram showing an initial display screen that includes the positioning image including an aortic valve/pulmonary valve, the ROI GUI, and the guide GUI.

FIG. 12 is a diagram showing an initial display screen that includes the positioning image including the aortic valve/pulmonary valve, the ROI GUI, and the guide GUI.

FIG. 12 shows the positioning image generated from volume data including the aortic valve/pulmonary valve, and is, for example, an axial image of X-Y section including the aortic valve/pulmonary valve.

The ROI GUI R and the guide GUI G are displayed on the axial image. The guide GUI G is a line (section) including the reference point detected in step ST4. Here, in the case of the axial image including the aortic valve/pulmonary valve, it is preferred that the detected reference points be the aortic valve (base) G1, G2. However, the configuration is not limited thereto. For example, the reference point may be the pulmonary valve (base).

The center position RC of the ROI GUI R may be set in the characteristic imaging region detected based on the volume data, set at the center of three or four reference points, or determined on the basis of the position of the guide GUI G. In the case of setting based on the position of the guide GUI G, the center position RC is determined on the basis of a point on the guide GUI G, e.g., a reference point G1, a reference point G2 or the midpoint of the reference points G1 and G2, and of a preset relative position. For example, in the case where the position (X, Y) of the midpoint of the reference points G1 and G2 is (x0, y0) and the preset relative position (Y, Z) is (xn, yn), the position of the center position RC is determined as (x0+xn, y0+yn). The preset relative position (xn, yn) may be determined on the basis of the attribute information as shown in FIGS. 3A to 3C.

The angle of the ROI GUI R is determined on the basis of the angle of the guide GUI G. For example, the ROI GUI R includes a side having an offset angle θ preset from the guide GUI G. In the example shown in FIG. 12, the ROI GUI R has a rectangular shape including a side (offset angle θ=0) parallel to the guide GUI G. The center lines R1 and R2 of the ROI GUI R may be displayed together with the ROI GUI R. The preset offset angle θ may be determined on the basis of the attribute information as shown in FIGS. 3A to 3C.

The positioning image initially displayed in step ST7 shown in FIG. 4 may be the axial image shown in FIG. 12, a sagittal image, a coronal image or an oblique section image. The positioning image to be initially displayed may be images selected from among the sagittal image, axial image, coronal image, and oblique section image.

In the case where the attribute information table T1 in FIG. 3A is referred to and the attribute information is "Aortic Valve/Pulmonary Valve" shown in FIG. 12, the movement control function 113 obtains the third piece M3 of movement information in step ST8. In this case, the interlock relationship between the guide GUI and the ROI GUI may be defined by the third piece M3 of movement information.

As described above, the medical image processing apparatus 10 turns the ROI GUI according to the turning operation for the guide GUI on the display screen, and independently controls sliding of the guide GUI and the ROI GUI according to the sliding operation for the guide GUI and the ROI GUI (e.g., the first piece M1 of movement information shown in FIG. 2A), thereby allowing the ROI setting efficiency to be improved. When the guide GUI and the ROI GUI are initially displayed on the basis of a reference point with a low detection accuracy, the moving operation for the guide GUI on the display screen is frequently performed by the operator. In this case, particularly, according to the medical image processing apparatus 10, it is possible to change the angle of the ROI GUI in the manner interlocked with the turning operation for the ROI GUI by the operator, and not to move the guide GUI in the interlocked manner regardless of the turning operation and sliding operation for the ROI GUI by the operator. In this manner, the medical image processing apparatus 10 allows the ROI setting efficiency to be significantly improved.

Furthermore, the medical image processing apparatus 10 can switch the interlocking relationship of the ROI GUI according to the moving operation for the guide GUI on the display screen (e.g., any of the five pieces M1 to M5 of movement information shown in FIGS. 2A to 2E). In this manner, the medical image processing apparatus 10 allows the ROI setting efficiency to be improved. When the guide GUI and the ROI GUI are initially displayed on the basis of a reference point with a low detection accuracy, the moving operation for the guide GUI on the display screen is frequently performed by the operator. In this case, particularly, according to the medical image processing apparatus 10, it is possible to change the position and angle of the ROI GUI in the manner interlocked with the moving operation for the guide GUI by the operator or leave the position and angle unchanged. In this manner, the medical image processing apparatus 10 allows the ROI setting efficiency to be significantly improved.

In particular, the medical image processing apparatus 10 can switch the interlocking relationships of the guide GUI and the ROI GUI on the display (e.g., any of the five pieces M1 to M5 of movement information shown in FIGS. 2A to 2E) on the basis of the imaging region information, the operator identification information, and the patient identification information. In this manner, the medical image processing apparatus 10 allows the ROI setting efficiency to be improved.

2. Second Embodiment

Figure 13:
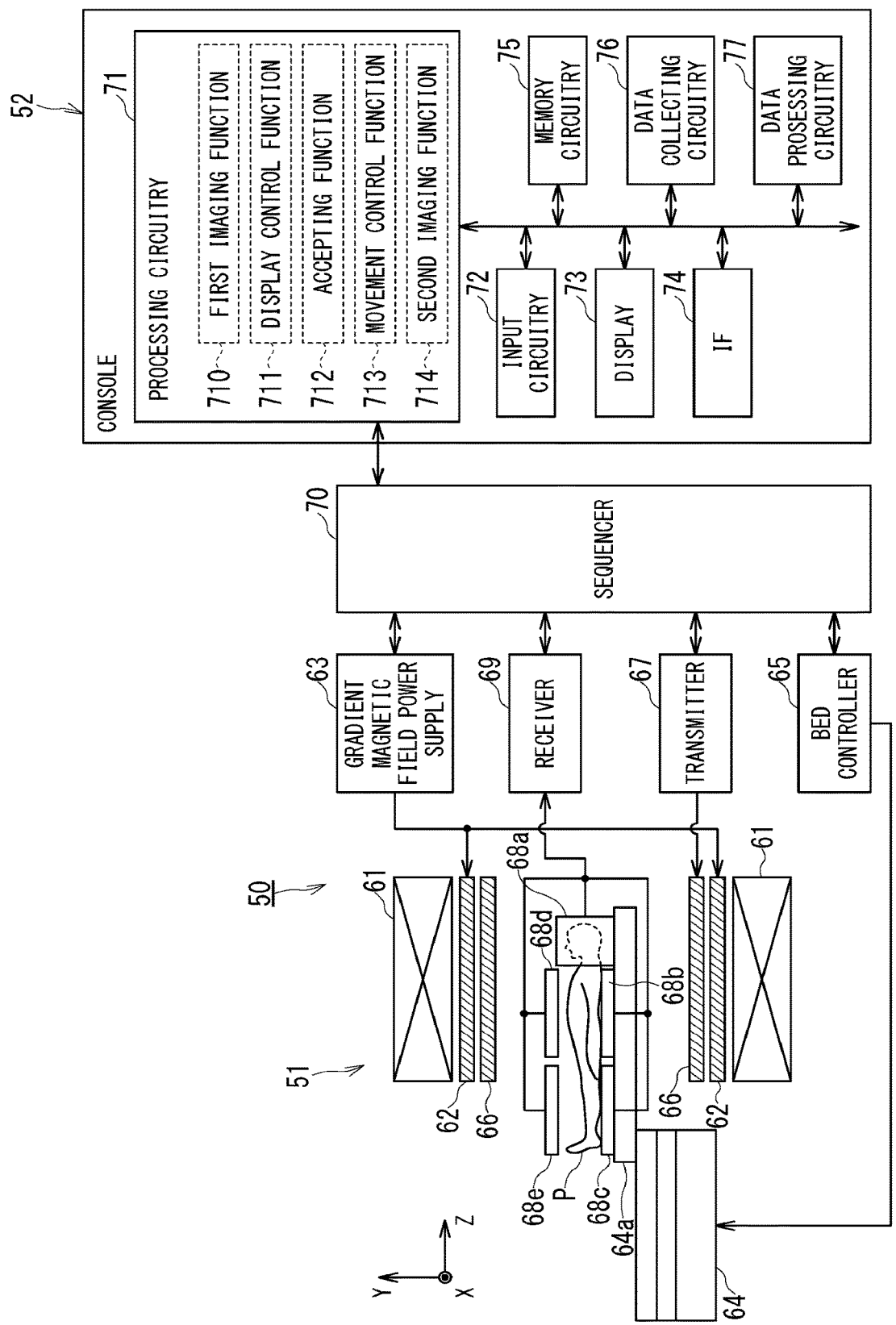
FIG. 13 is a schematic diagram showing a configuration of an MRI apparatus according to a second embodiment.

FIG. 13 is a schematic diagram showing a configuration of an MRI apparatus according to a second embodiment.

FIG. 13 shows the MRI apparatus 50 that images an imaging region to be imaged on an object (e.g., patient) P according to the second embodiment. The MRI apparatus 50 sets a ROI using functions subsequently equivalent to the functions described on the medical image processing apparatus 10 according to the first embodiment on the basis of medical image data, for example, volume data. The MRI apparatus 50 performs diagnostic imaging (e.g., imaging for obtaining a diagnostic image) for the set ROI.

Even if the diagnostic imaging is accompanied by application of a RF signal and a gradient magnetic field to an auxiliary region, such as a tag region, the MRI apparatus 50 can set a ROI for the auxiliary region. The volume data which is an original of the ROI is set, may be generated by the MRI apparatus 50 itself or by another medical image diagnostic apparatus, such as an X-ray CT apparatus. In the case where the volume data is generated by the MRI apparatus 50 itself, the MRI apparatus 50 generates the volume data through a preliminary imaging such as a locater imaging performed before the diagnostic imaging. The preliminary imaging according to the present embodiment is not limited to the locater imaging. In the case where multiple diagnostic imagings are performed according to multiple protocols in an examination by the MRI apparatus 50, the MRI apparatus 50 may generate the volume data by a preceding diagnostic imaging which is one of the preliminary imaging. The description is hereinafter made assuming that the volume data which is the original of the ROI is set is generated by the MRI apparatus 50 itself.

The MRI apparatus 50 comprises a scanner 51 and a console 52 in a broad sense.

The scanner 51 includes a static field magnet 61, an gradient magnetic field coil 62, an gradient magnetic field power supply 63, a bed 64, a bed controller 65, a transmitter coil 66, a transmitter 67, a receiver coils (receiving RF coils) 68a to 68e, a receiver 69, and a sequencer (sequence controller) 70.

The static field magnet 61 generates a static field in a bore (the internal space of the static field magnet 61), which is a region to be imaged on an object (e.g., a patient). The static field magnet 61 internally includes a superconducting coil. The superconducting coil is cooled at a cryogenic temperature with liquid helium. The static field magnet 61 applies, to the superconducting coil, current supplied by a power source for a static field (now shown) in a magnetically excited mode. This application generates a static field. Subsequently, the mode transitions to a persistent current mode, and then the coil is separated from the power source for a static field. Once transitioning to the persistent current mode, the static field magnet 61 continues to generate a large static field for a long time, e.g., one year or more. The static field magnet 61 may be a permanent magnet.

The gradient magnetic field coil 62 is arranged in the static field magnet 61, and serves as a gradient magnetic field generator that generates a gradient magnetic field in the interior space. The gradient magnetic field coil 62 is made of a combination of three coils that correspond to respective axes, X, Y and Z orthogonal to each other. These three coils are individually supplied with current by the gradient magnetic field power supply 63, and generate the gradient magnetic field with magnetic intensity varying along the X, Y and Z axes. The Z-axis direction is configured to be identical to that of the static magnetic field.

The gradient magnetic fields on the X, Y and Z axes generated by the gradient magnetic field coil 62 correspond to, for example, a gradient magnetic field for readout Gr, a gradient magnetic field for phase encoding Ge, and a gradient magnetic field for slice selection Gs, respectively. The gradient magnetic field for readout Gr is used to change the frequency of the MR (magnetic resonance) signal according to the spatial position. The gradient magnetic field for phase encoding Ge is used to change the phase of the MR signal according to the spatial position. The gradient magnetic field for slice selection Gs is used to freely determine the imaging section.

The gradient magnetic field power supply 63 supplies current to the gradient magnetic field coil 62 on the basis of pulse sequence execution data transmitted from the sequencer 70.

The bed 64 includes a top table 64a on which the object P is laid. The bed 64 inserts the top table 64a into a hollow space (imaging bore) of the gradient magnetic field coil 62 in the state where the object P is laid thereon, under control by the bed controller 65, which is described later. Typically, the bed 64 is arranged so as to have a longitudinal axis parallel to the center axis of the static field magnet 61.

The bed controller 65 drives the bed 64 to move the top table 64a in the longitudinal direction and the vertical direction under control by the sequencer 70.

The transmitter coil 66 is arranged in the gradient magnetic field coil 62, and supplied by the transmitter 67 with the RF pulse signal to generate the RF pulse.

The transmitter 67 transmits, to the transmitter coil 66, the RF pulse signal in conformity with the Larmor frequency, on the basis of the pulse sequence execution data transmitted from the sequencer 70.

The receiver coils 68a to 68e are arranged in the gradient magnetic field coil 62 and receive the MR signal emitted from the imaging region to be imaged on the object P under effects of the high-frequency magnetic field. Here, the receiver coils 68a to 68e are array coils that include element coils for receiving the MR signal emitted from the imaging region to be imaged on the object P. When each element coil receives the MR signal, the receiver coil transmits the received MR signal to the receiver 69.

The receiver coil 68a is a coil for a head to be worn by the object P on the head. The receiver coils 68b and 68c are coils for the spine that is arranged between the back of the object P and the top table 64a. The receiver coils 68d and 68e are coils for the abdomen to be worn by the object P on the abdominal side.

The receiver 69 generates the MR signal on the basis of the MR signals output from the receiver coils 68a to 68e according to the pulse sequence execution data transmitted from the sequencer 70. Upon generating the MR signal, the receiver 69 transmits the MR signal to the console 52 through the sequencer 70.

The receiver 69 has receiving channels for receiving the MR signals output from the element coils of the receiver coils 68a to 68e. When notification of the element coil to be used for imaging is made from the consol 52, the receiver 69 assigns the receiving channel to the element coil designated by the notification so as to receive the MR signal output from the designated element coil.

The sequencer 70 is connected to the gradient magnetic field power supply 63, the bed controller 65, the transmitter 67, the receiver 69, and the consol 52. The sequencer 70 stores control information required to drive the gradient magnetic field power supply 63, the bed controller 65, the transmitter 67, and the receiver 69. The control information may be, for example, sequence information that includes operation control information, such as the intensity, application time and application timing of the pulse current to be applied to the gradient magnetic field power supply 63.

The sequencer 70 causes the bed controller 65 to perform driving according to the predetermined sequence stored, thereby advancing and retracting the top table 64a in the Z direction with respect to the base. Furthermore, the sequencer 70 drives the gradient magnetic field power supply 63, the transmitter 67, and the receiver 69 according to the predetermined sequence stored, thereby generating an X-axis gradient magnetic field Gx, a Y-axis gradient magnetic field Gy, and a Z-axis gradient magnetic field Gz, and a RF pulse signal in the base.

The console 52 performs the entire control of the MRI apparatus 50, data collection, image reconstruction and the like. The console 52 includes processing circuitry 71, an input circuit 72, a display 73, an IF 74, memory circuitry 75, data collecting circuitry 76, and data processing circuitry 77.

The processing circuitry 71 has a configuration equivalent to that of the processing circuitry 11 shown in FIG. 1. The processing circuitry 71 performs a first imaging function (first imager) 710, a display control function (display controller) 711, an accepting function (acceptor) 712, a movement control function (movement controller) 713, and a second imaging function (second imager) 714. Here, the display control function 711, the accepting function 712 and the movement control function 713 have functions equivalent to those of the display control function 111, the accepting function 712 and the movement control function 113, which are shown in FIG. 1, respectively. The processing circuitry 71 reads various types of control programs stored in the memory circuitry 75 and performs the functions 710 to 714, and integrally controls processing operations in the components 72 to 77.

The first imaging function 710 performs first imaging to generate volume data on an imaging region to be imaged, and causes the memory circuitry 75 to store the volume data. The first imaging is the locater imaging for positioning before the diagnostic imaging (actual imaging), or imaging according to a preceding protocol before a subsequent protocol in the case where multiple protocols are performed. The case where the first imaging is the locater imaging for positioning before the diagnostic imaging is hereinafter described. The pulse sequence for three-dimensional imaging as the locater imaging may be different from the pulse sequence used for diagnostic imaging. It is desired that the three-dimensional imaging as the locater imaging should obtain the volume data in a time as short as possible. Consequently, it is preferred to use a pulse sequence for high-speed three-dimensional imaging. For example, it is preferred that the pulse sequence for three-dimensional imaging for positioning be three-dimensional imaging using the 3D FFE (fast field echo) sequence, FFE sequence, SSFP sequence or the like. However, the sequence is not necessarily limited thereto.

The second imaging function 714 regards the ROI set by the movement control function 713, as a field of view (FOV), executes the diagnostic imaging (actual imaging) using various diagnostic sequences, and generates a diagnostic image. The diagnostic sequence may be, for example, a T2-weighted image, T1-weighted image, FLAIR, Diffusion, and T2*-weighted image. However, the diagnostic sequence is not limited thereto. Alternatively, the sequence is appropriately determined in conformity with the imaging purpose of the diagnostic imaging.

The input circuit 72 has a configuration equivalent to that of the input circuit 12 shown in FIG. 1. The display 73 has a configuration equivalent to that of the display 13 shown in FIG. 1. The IF 74 has a configuration equivalent to that of the IF 14 shown in FIG. 1. The memory circuitry 75 has a configuration equivalent to that of the memory circuitry 15 shown in FIG. 1.

The data collecting circuitry 76 collects the MR signal transmitted from the receiver 69. After collecting the MR signal, the data collecting circuitry 76 causes the memory circuitry 75 to store the collected MR signal.

The data processing circuitry 77 applies a postprocess, which is a reconstruction process, such as Fourier transformation, to the MR signal stored in the memory circuitry 75, thereby generating the spectrum data on the desired nuclear spins in the imaging region to be imaged on the object P, or image data. When the locater imaging is performed, the data processing circuitry 77 generates profile data that represents the distribution of the MR signal in the arrangement direction of the element coils included in the receiver coils 68*a* to 68*e*, for each of the coils, on the basis of the MR signals received by the element coils. The data processing circuitry 77 stores the various data items generated in the memory circuitry 75.

Figure 14:
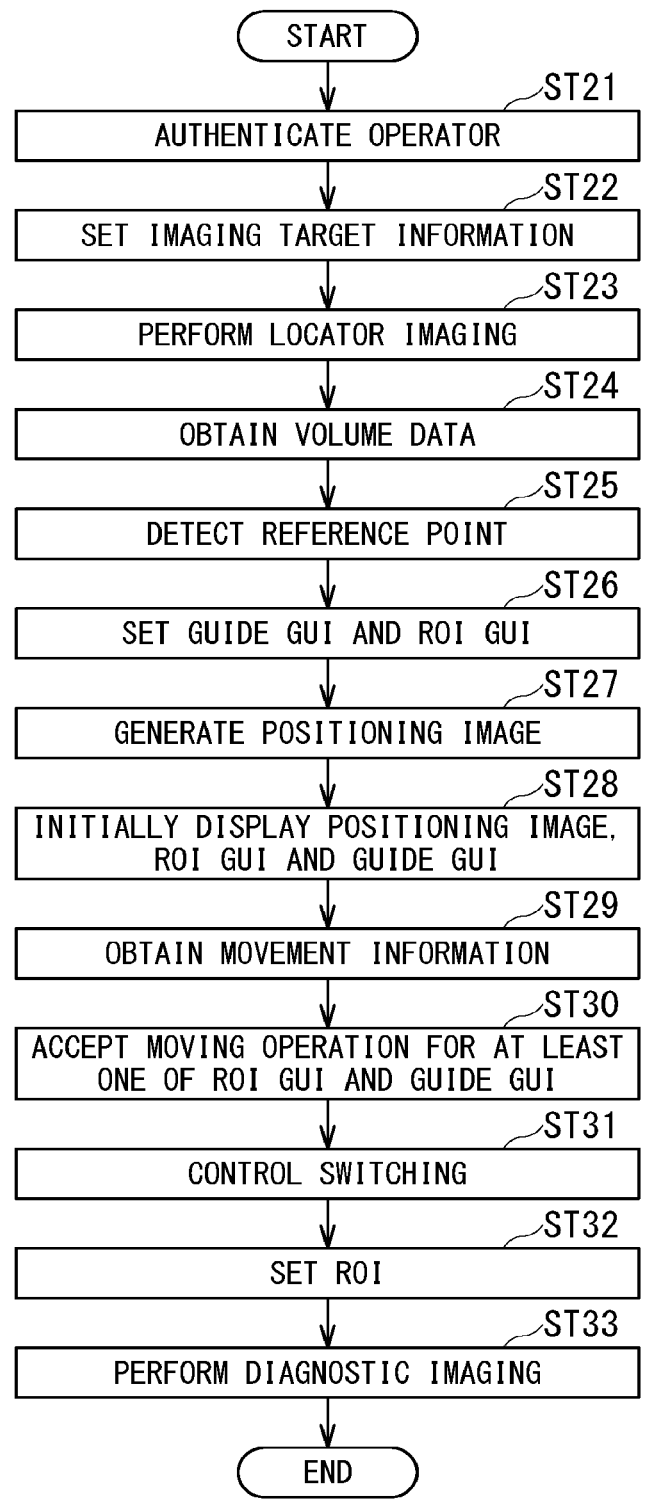
FIG. 14 is a flowchart for specifically describing functions of an MRI apparatus according to a second embodiment.

FIG. 14 is a flowchart for specifically describing functions of the MRI apparatus 50 according to the second embodiment.

The identification information, the password and the like of the operator are input through the input circuit 72 by the operator, thereby allowing the first imaging function 710 of the MRI apparatus 50 to authenticate the operator (step ST21).

First, the first imaging function 710 sets the imaging region information (imaging region to be imaged) in the volume data (step ST22). Next, the first imaging function 710 performs the locater imaging for positioning before the diagnostic imaging (actual imaging) to generate the volume data on the imaging region to be imaged, and store the volume data into the memory circuitry 75 (step ST23).

When a desired volume data is designated through the input circuit 72, the display control function 711 obtains or reads the desired volume data from the memory circuitry 75 (step ST24).

The display control function 711 detects the reference point on the basis of the volume data obtained in step ST24 as with the case of step ST4 (shown in FIG. 4) (step ST25). It may be configured such that the reference point detected in step ST25 is different according to the type of the imaging region information set in step ST22.

The display control function 711 sets the guide GUI including the reference point detected in step ST25 while setting the ROI GUI, as with the case in step ST5 (shown in FIG. 4) (step ST26). The display control function 711 generates the positioning image from the volume data obtained in step ST24, as with the case in step ST6 (shown in FIG. 4) (step ST27). The display control function 711 initially displays, on the display 73, the positioning image generated in step ST27, and the guide GUI and ROI GUI set in step ST26, as with the case in step ST7 (shown in FIG. 4) (step ST28).

The initial display screen displayed in step ST28 is equivalent to the initial display screens shown in FIGS. 5, 11 and 12.

The accepting function 712 refers to the attribute information (e.g., any of the attribute information tables T1 to T3 shown in FIGS. 3A to 3C) stored in the memory circuitry 75, as the case in step ST8 (shown in FIG. 4). The accepting function 712 obtains the movement information indicating whether to move the guide GUI and the ROI GUI or not (e.g., any of pieces M1 to M5 of movement information shown in FIGS. 2A to 2E), as with the case in step ST8 (step ST29).

The accepting function 712 accepts moving operation for at least one of the ROI GUI and the guide GUI through the input circuit 72, as with the case in step ST9 (shown in FIG. 4) (step ST30). The movement control function 713 controls switching of whether to move the guide GUI and the ROI GUI or not according to the moving operation for the moving operation target on the basis of the movement information obtained in step ST29 (or movement information after change in step ST10d shown in FIG. 6), as with the case in step ST10 (shown in FIG. 4) (step ST31).

The guide GUI or the ROI GUI on the display screen is subjected to the moving operation according to the control in step ST 31, thereby allowing the movement control function 713 to set the ROI, as with the case in step ST11 (shown in FIG. 4) (step ST32).

The second imaging function 714 regards the ROI set in step ST32 as the field of view, performs the diagnostic imaging (actual imaging) using various diagnostic sequences, and generates a diagnostic image (step ST33).

The ROI set in step ST32 is not limited to the case where the ROI is the field of view. The ROI may be an auxiliary region set separately from the field of view. For example, in the case of using a presaturation pulse in the diagnostic imaging, the auxiliary region may be a region to be saturated according to the presaturation pulse (presaturation region). Alternatively, the auxiliary region may be, for example, a labeling region used in the Time-SLIP method and the like (or a tag region). The Time-SLIP method is an imaging method that uses no contrast medium, and is a technique that applies a labeling pulse to the labeling region to label fluid to thereby allow the fluid flowing from the labeling region to the outside of the region to be observed.

For example, in the case of imaging for observing the CSF (cerebrospinal fluid) in foramen of Monro, the display control function 711 detects the foramen of Monro as the reference point from a coronal section image as the positioning image, and sets the ROI GUI centered on a position apart from the foramen of Monro in parallel to the orientation of the foramen of Monro having a certain angle by a predetermined distance (e.g., 1 [mm]) toward the third ventricle.

As described above, the MRI apparatus 50 turns the ROI GUI according to the turning operation for the guide GUI on the display screen, and independently controls sliding of the guide GUI and the ROI GUI according to the sliding operation for the guide GUI and the ROI GUI (e.g., the first piece M1 of movement information shown in FIG. 2A), thereby allowing the ROI (field of view) setting efficiency to be improved. When the guide GUI and the ROI GUI are initially displayed on the basis of a reference point with a low detection accuracy, the moving operation for the guide GUI on the display screen is frequently performed by the operator. In this case, particularly, according to the MRI apparatus 50, it is possible to change the angle of the ROI GUI in the manner interlocked with the turning operation for the guide GUI by the operator, and not to move the guide GUI in the interlocked manner regardless of the turning operation and sliding operation for the ROI GUI by the operator. In this manner, the MRI apparatus 50 allows the ROI setting efficiency to be significantly improved.

Furthermore, the MRI apparatus 50 can switch the interlocking relationship of the ROI GUI according to the moving operation for the guide GUI on the display screen (e.g., any of the five pieces M1 to M5 of movement information shown in FIGS. 2A to 2E). In this manner, the MRI apparatus 50 allows the ROI (field of view) setting efficiency to be improved. When the guide GUI and the ROI GUI are initially displayed on the basis of a reference point with a low detection accuracy, the moving operation for the guide GUI on the display screen is frequently performed by the operator. In this case, particularly, according to the MRI apparatus 50, it is possible to change the position and angle of the ROI GUI in the manner interlocked with the moving operation for the guide GUI by the operator or leave the position and angle unchanged. In this manner, the MRI apparatus 50 allows the ROI setting efficiency to be significantly improved.

In particular, the MRI apparatus 50 can switch the interlocking relationships of the guide GUI and the ROI GUI on the display screen (e.g., the five pieces M1 to M5 of movement information shown in FIGS. 2A to 2E) on the basis of the imaging region information, the operator identification information, and the patient identification information. In this manner, the MRI apparatus 50 allows the imaging region (ROI) efficiency in diagnostic imaging and auxiliary ROI such as the labeling region setting efficiency to be improved.

At least one of the aforementioned embodiments allows one of the movement control functions 113 and 713 to function, thereby allowing the efficiency of setting ROI on the display screen to be improved.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A medical image processing apparatus, comprising:
processing circuitry configured to
   determine a position and an angle of a guide GUI to be initially displayed, and a position and an angle of a region of interest (ROI) GUI to be initially displayed, based on a reference point detected based on a medical image, the ROI GUI being a standard for three-dimensional image generating, the guide GUI being for guiding a setting of the ROI on the medical image,
   accept an operation for the ROI GUI and the guide GUI shown on the same medical image displayed on a screen, and
   decide whether to move the ROI GUI and the guide GUI on the fixed medical image in a manner interlocked with each other or not according to a preset condition, when a turning operation or a sliding operation for any one of the ROI GUI and the guide GUI is accepted.

2. The apparatus according to claim 1,
wherein when the sliding operation for one of the ROI GUI and the guide GUI is accepted, the processing circuitry is configured to slide only the GUI for which the sliding operation is accepted, according to the condition.

3. The apparatus according to claim 2,
wherein when the turning operation for one of the ROI GUI and the guide GUI is accepted, the processing circuitry is configured to turn the ROI GUI and the guide GUI in a manner interlocked with each other according to the condition.

4. The apparatus according to claim 1,
wherein the processing circuitry is configured to generate an image including a ROI indicated by the ROI GUI, based on the medical image.

5. The apparatus according to claim 1,
wherein when the turning operation for the ROI GUI is accepted, the processing circuitry is configured to control the guide GUI not to be turned, according to the condition.

6. The apparatus according to claim 1,
wherein the processing circuitry is configured to
adopt, as the condition, a combination of an operation target, an operation type and a moving target, the operation target including the ROI GUI and the guide GUI, the operation type including the turning operation and the sliding operation, and the moving target including the ROI GUI and the guide GUI, and
perform control according to control content corresponding to the adopted condition.

7. The apparatus according to claim 1,
wherein the processing circuitry is configured to
adopt, as the condition, at least one of pieces of attribute information that are imaging purpose information, operator identification information, and object identification information, and
perform control according to control content corresponding to the adopted condition.

8. The apparatus according to claim 7,
wherein when the adopted condition is a desired piece of the attribute information, and when the turning operation for the guide GUI is accepted, the processing circuitry is configured to turn the ROI GUI according to the control content corresponding to the desired piece of the attribute information.

9. The apparatus according to claim 8,
wherein the processing circuitry is configured to
refer to a memory that stores an attribute information table associating control content with the attribute information so as to obtain the desired piece of the control content corresponding to the desired piece of the attribute information, and
turn, when the turning operation for the guide GUI is accepted, the ROI GUI according to the desired control content.

10. The apparatus according to claim 9,
wherein the processing circuitry is configured to change the desired control content according to an instruction through an input device operable by the operator.

11. The apparatus according to claim 1,
wherein the processing circuitry is configured to determine the position and the angle of the guide GUI to be initially displayed, and the position and the angle of the ROI GUI to be initially displayed, based on the reference point and on at least one of pieces of attribute information that are identification information on an imaging purpose, operator identification information, and object identification information.

12. The apparatus according to claim 1,
wherein the processing circuitry is configured to display the condition, and control content corresponding to the condition, on the screen.

13. The apparatus according to claim 1,
wherein the processing circuitry is configured to display, on the screen, a relative angle of the guide GUI after the turning operation with respect to the angle of the guide GUI to be initially displayed.

14. The apparatus according to claim 1,
wherein when the turning operation for one of the ROI GUI and the guide GUI is accepted, the processing circuitry is configured to
designate the ROI GUI and the guide GUI by broken lines,
after designating the ROI GUI and the guide GUI by the broken lines, turn the ROI GUI and the guide GUI in a manner interlocked with each other according to the condition, and
after turning the ROI GUI and the guide GUI, designate the ROI GUI and the guide GUI by solid lines.

15. The apparatus according to claim 1,
wherein the processing circuitry is further configured to detect an anatomical characteristic region as the reference point in accordance with a type of an imaging region related to the medical image.

16. The apparatus according to claim 1,
wherein the processing circuitry is further configured to set the guide GUI at a position including the reference point.

17. A magnetic resonance imaging apparatus, comprising:
a static magnetic field generator configured to generate a static magnetic field;
a gradient magnetic field generator configured to generate a gradient magnetic field;
a transmitter coil configured to apply a high-frequency pulse to an object; and
processing circuitry configured to
generate a medical image, based on a signal corresponding to the high-frequency pulse,
determine a position and an angle of a guide GUI to be initially displayed, and a position and an angle of an region of interest (ROI) GUI to be initially displayed, based on a reference point detected based on the medical image, the ROI GUI being a standard for three-dimensional image generating, the guide GUI being for guiding a setting of the ROI on the medical image,
accept an operation for the ROI GUI and the guide GUI shown on the same medical image displayed on a screen, and
decide whether to move the ROI GUI and the guide GUI on the fixed medical image in a manner interlocked with each other or not, according to a preset condition, when a turning operation or a sliding operation for any one of the ROI GUI and the guide GUI is accepted.

18. The apparatus according to claim 17,
wherein when the sliding operation for one of the ROI GUI and the guide GUI is accepted, the processing circuitry is configured to slide only the GUI for which the sliding operation is accepted, according to the condition.

19. The apparatus according to claim 18,
wherein when the turning operation for one of the ROI GUI and the guide GUI is accepted, the processing circuitry is configured to turn the ROI GUI and the guide GUI in a manner interlocked with each other according to the condition.

20. A medical image processing method, comprising:
obtaining a medical image from memory circuitry;
displaying the medical image on a screen of a display;
determining a position and an angle of a guide GUI to be initially displayed, and a position and an angle of a region of interest (ROI) GUI to be initially displayed, based on a reference point detected based on the medical image, the ROI GUI being a standard for three-dimensional image generating, the guide GUI being for guiding a setting of the ROI on the medical image;

accepting an operation for the ROI GUI and the guide GUI shown on the same medical image displayed on the screen, and deciding whether to move the ROI GUI and the guide GUI on the fixed medical image in a manner interlocked with each other or not according to a preset condition, when a turning operation or a sliding operation for any one of the ROI GUI and the guide GUI is accepted.

* * * * *